United States Patent
Graif et al.

(10) Patent No.: US 10,678,723 B2
(45) Date of Patent: Jun. 9, 2020

(54) URGENT IN-BAND INTERRUPTS ON AN I3C BUS

(71) Applicant: QUALCOMM Incorporated, San Diego, CA (US)

(72) Inventors: Sharon Graif, Zichron Yakov (IL); Lior Amarilio, Yokneam (IL); Mark Gakman, Boston, MA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 16/134,559

(22) Filed: Sep. 18, 2018

(65) Prior Publication Data

US 2020/0089632 A1    Mar. 19, 2020

(51) Int. Cl.
*G06F 13/24*    (2006.01)
*G06F 13/362*   (2006.01)
*G06F 13/42*    (2006.01)

(52) U.S. Cl.
CPC ............ *G06F 13/24* (2013.01); *G06F 13/362* (2013.01); *G06F 13/4291* (2013.01)

(58) Field of Classification Search
CPC ..... G06F 13/24; G06F 13/362; G06F 13/4291
See application file for complete search history.

(56) References Cited

U.S. PATENT DOCUMENTS

| 9,727,506 | B2* | 8/2017 | Takahashi ............. G06F 13/362 |
| 2015/0309960 | A1 | 10/2015 | Pitigoi-Aron et al. |
| 2016/0147684 | A1 | 5/2016 | Sengoku |
| 2017/0097912 | A1 | 4/2017 | Takahashi et al. |
| 2019/0347225 | A1* | 11/2019 | Mishra ................ G06F 13/4291 |

OTHER PUBLICATIONS

International Search Report and Written Opinion—PCT/US2019/050830—ISA/EPO—dated Nov. 20, 2019.

* cited by examiner

*Primary Examiner* — Idriss N Alrobaye
*Assistant Examiner* — Richard B Franklin

(57) ABSTRACT

Systems, methods, and apparatus are described that enable communication of in-band reset signals over an I3C serial bus. A method performed at a slave device includes driving a data line of the I3C serial bus from a high state to a low state before a first clock pulse is received from a clock line of the I3C serial bus after a start condition has been provided on the I3C serial bus, where driving the data line from the high state to the low state produces an initial pulse on the data line, transmitting one or more additional pulses on the data line before the first clock pulse is transmitted on the clock line, and driving the data line low until a rising edge of the first clock pulse is detected on the clock line after each of the plurality of additional pulses has been successfully transmitted on the data line.

30 Claims, 14 Drawing Sheets

1100

```
        ( Slave )
            │
            ▼                                              ┌─ 1102
┌────────────────────────────────────────────────┐
│ Drive a data line of an I3C serial bus from a high │
│   state to a low state before a first clock pulse is │
│    received from a clock line of the I3C serial bus │
│    after a start condition has been provided on the │
│  I3C serial bus, wherein driving the data line from │
│    the high state to the low state produces an initial │
│              pulse on the data line              │
└────────────────────────────────────────────────┘
            │
            ▼                                              ┌─ 1104
┌────────────────────────────────────────────────┐
│    Transmit one or more additional pulses on the │
│      data line before the first clock pulse is     │
│              transmitted on the clock line         │
└────────────────────────────────────────────────┘
            │
            ▼            ┌─ 1106
         ◇ Success? ◇ ─── No ───────────────┐
            │                                  │
           Yes                                 │
            ▼                    ┌─ 1108       │
┌────────────────────────────────────────────┐ │
│  Drive the data line low until a rising edge of the│ │
│ first clock pulse is detected on the clock line after│ │
│ each of the plurality of additional pulses has been │ │
│      successfully transmitted on the data line     │ │
└────────────────────────────────────────────────┘ │
            │                                  │
            ▼                                  ▼
         ( Stop )                           ( Stop )
```

*FIG. 11*

URGENT IN-BAND INTERRUPTS ON AN I3C BUS

TECHNICAL FIELD

The present disclosure relates generally to an interface between processing circuits and peripheral devices and, more particularly, to providing accelerated in-band interrupt capability on a serial bus.

BACKGROUND

Mobile communication devices may include a variety of components including circuit boards, integrated circuit (IC) devices and/or System-on-Chip (SoC) devices. The components may include processing circuits, user interface components, storage and other peripheral components that communicate through a serial bus. The serial bus may be operated in accordance with a standardized or proprietary protocol.

For example, the Inter-Integrated Circuit serial bus, which may also be referred to as the I2C bus or the $I^2C$ bus, is a serial single-ended computer bus that was intended for use in connecting low-speed peripherals to a processor. In some examples, a serial bus may employ a multi-master protocol in which one or more devices can serve as a master and a slave for different messages transmitted on the serial bus. Data can be serialized and transmitted over two bidirectional wires, which may carry a data signal, which may be carried on a Serial Data Line (SDA), and a clock signal, which may be carried on a Serial Clock Line (SCL).

In one example, the protocols used on an I3C bus derive certain implementation aspects from the I2C protocol, while improving throughput and control of the serial bus. Original implementations of I2C supported data signaling rates of up to 100 kilobits per second (100 kbps) in standard-mode operation, with more recent standards supporting speeds of 400 kbps in fast-mode operation, and 1 megabit per second (Mbps) in fast-mode plus operation. The I3C protocol can increase available bandwidth on the serial bus through higher transmitter clock rates, use of double data rate encoding, encoding data in signaling state of two or more wires, and through other encoding techniques. In conventional systems, devices coupled to a serial bus may support out-of-band signaling, such as interrupt signals sent by a slave device using dedicated signal wires or traces. Dedicated interrupt signal wires are increasingly unavailable to designers as functionality of mobile communication devices escalate. In-band interrupt capabilities have been introduced to permit one device to interrupt another device. When multiple devices assert an interrupt concurrently, lower-priority devices may fail to obtain service from the interrupted device. Improvements are continually needed to improve data throughput, reduce latency and improve control signaling.

SUMMARY

Certain aspects of the disclosure relate to systems, apparatus, methods and techniques that provide an enhanced interrupt capability using in-band signaling when a serial bus is operated in accordance with an I3C protocol. Bus master and slave devices may be adapted to implement these techniques when coupled to an I3C serial bus.

In various aspects of the disclosure, a data communication method performed at a slave device includes driving a data line of the I3C serial bus from a high state to a low state before a first clock pulse is received from a clock line of the I3C serial bus after a start condition has been provided on the I3C serial bus. The method further includes driving the data line from the high state to the low state produces an initial pulse on the data line, transmitting one or more additional pulses on the data line before the first clock pulse is transmitted on the clock line, and driving the data line low until a rising edge of the first clock pulse is detected on the clock line after each of the plurality of additional pulses has been successfully transmitted on the data line.

In one aspect, the method includes causing a line driver coupling the slave device to the data line bus to enter an open-drain mode of operation before driving the data line from the high state to the low state. In one aspect, driving the data line low suppresses a pulse transmitted on the data line by one or more other slave devices. In one aspect, the method includes terminating transmission on the data line until another start condition is provided on the I3C serial bus after detecting that one of the plurality of additional pulses has been suppressed. In one aspect, the method includes participating in an interrupt service activity after each of the plurality of additional pulses has been successfully transmitted on the data line. In one aspect, plurality of additional pulses includes a number of pulses provided in accordance with configuration information maintained by the slave device.

In certain aspects, the method includes initiating an urgent in-band interrupt request after participating unsuccessfully a number of interrupt service arbitration procedures that exceeds a threshold maximum number of interrupt service arbitration procedures defined for the slave device. The urgent in-band interrupt request may be initiated by driving the data line from the high state to the low state before the first clock pulse is received from the clock line. The method may include participating in an urgent interrupt identification and arbitration process after initiating the urgent in-band interrupt request. The urgent interrupt identification and arbitration process may be decided based on number of plurality of additional pulses associated with each device participating in the urgent interrupt identification and arbitration process.

In various aspects of the disclosure, an apparatus adapted or configured to function as a slave device includes a processor and a line driver adapted to couple the apparatus to a data line of an I3C serial bus and configurable for an open-drain mode of operation. The processor may be configured to cause the line driver to drive the data line from a high state to a low state before a first clock pulse is received from a clock line of the I3C serial bus after a start condition has been provided on the I3C serial bus. Driving the data line from the high state to the low state produces an initial pulse on the data line. The processor may be configured to transmit one or more additional pulses on the data line before the first clock pulse is transmitted on the clock line, and drive the data line low until a rising edge of the first clock pulse is detected on the clock line after each of the plurality of additional pulses has been successfully transmitted on the data line.

In various aspects of the disclosure, a data communication method performed at a bus master includes driving a clock line of the I3C serial bus low to complete a start condition on the I3C serial bus, and detecting that a data line of the I3C serial bus has been driven from a high state to a low state by another device after the start condition has been completed and before a first clock pulse is transmitted over the clock line. An initial pulse is received from the data line when the data line is driven from the high state to the low state. The method further includes receiving one or more additional pulses from the data line before the first clock pulse is transmitted over the clock line, transmitting the first clock pulse over the clock line after the data line is in a low state for a minimum duration of time, and selecting a slave device for interrupt service based on a tally of the initial pulse and the one or more additional pulses.

In one aspect, the method includes causing a line driver coupling the bus master to the data line to enter an open-drain mode of operation before driving the clock line of the I3C serial bus low to complete the start condition. In one aspect, the method includes initiating the start condition on the I3C serial bus. In one aspect, the method includes determining a unique address of the slave device selected for interrupt service by using the tally to index a table of configuration information.

In certain aspects, the method includes initiating an interrupt service activity involving the slave device selected for interrupt service after transmitting the first clock pulse over the clock line. The method may include selecting the interrupt service activity by using the tally to index a table of configuration information. The method may include writing configuration information to one or more slave devices, the configuration information including a number of pulses to be transmitted by the one or more slave devices during an urgent interrupt identification and arbitration process. For each slave device, the pulses to be transmitted during the urgent interrupt identification and arbitration process include the initial pulse and a number of additional pulses.

In various aspects of the disclosure, an apparatus adapted or configured to function as a bus master includes a processor, a first line driver adapted to couple the apparatus to a clock line of an I3C serial bus, and a second line driver adapted to couple the apparatus to a data line of the I3C serial bus, the second line driver being configurable for an open-drain mode of operation. The processor may be configured to cause the first line driver to drive a clock line of an I3C serial bus low to complete a start condition on the I3C serial bus, detect that a data line of the I3C serial bus has been driven from a high state to a low state by another device after the start condition has been completed and before a first clock pulse is transmitted over the clock line, where an initial pulse is received from the data line when the data line is driven from the high state to the low state, receive one or more additional pulses from the data line before the first clock pulse is transmitted over the clock line, cause the first line driver to transmit the first clock pulse over the clock line after the data line is in a low state for a minimum duration of time, and select a slave device for interrupt service based on a tally of the initial pulse and the one or more additional pulses.

BRIEF DESCRIPTION OF THE DRAWINGS

FIG. 11 is a flowchart illustrating a data communication method performed at a slave device coupled to a serial bus in accordance with certain aspects disclosed herein.

DETAILED DESCRIPTION

Figure 1:
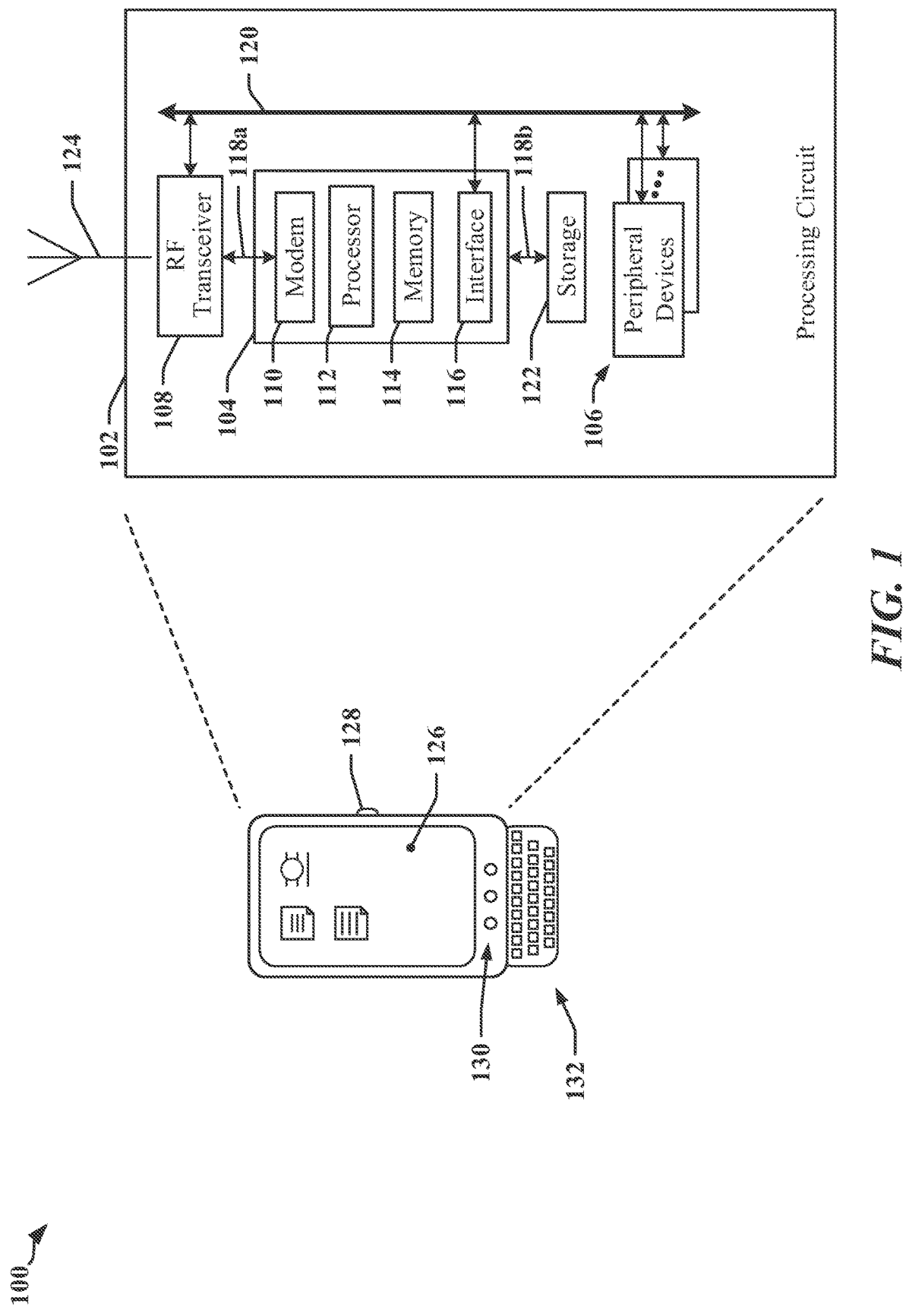
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a serial bus to connect an application processor or other host device with modems and other peripherals. The serial bus may be operated in accordance with specifications and protocols defined by a standards body. In one example, the serial bus may be operated in accordance with I3C protocols that define timing relationships between signals and transmissions. In some implementations, devices limited to communicating in accordance with I2C protocols can coexist on a serial bus with devices that communicate in accordance with I3C protocols.

Certain I3C slave devices may be configured to assert in-band interrupts from time-to-time. A bus master services in-band interrupt requests on a priority basis. The interrupt-asserting slave device having the highest priority is serviced first. A low-priority device may be starved of service when higher-priority devices compete at every interrupt opportunity.

Certain aspects disclosed herein provide techniques for enabling low-priority slave devices to be temporarily promoted to a higher-tier of prioritization in which the promoted device can participate in an urgent interrupt arbitration process that may pre-empt interrupt requests asserted by devices operating in a lower-tier of prioritization. In some implementations, an urgent in-band interrupt arbitration process is initiated before a conventional interrupt request arbitration process can be performed, allowing promoted slave devices a better opportunity to obtain interrupt service. In one example, the promoted slave device may drive a data line of the I3C serial bus from a high state to a low state before a first clock pulse is received from a clock line of the I3C serial bus after a start condition has been provided on the I3C serial bus, where driving the data line from the high state to the low state produces an initial pulse on the data line. The promoted slave device may then transmit one or more additional pulses on the data line before the first clock pulse is transmitted on the clock line, and may drive the data line low until a rising edge of the first clock pulse is detected on the clock line after each of the plurality of additional pulses has been successfully transmitted on the data line.

Example of an Apparatus with a Serial Data Link

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
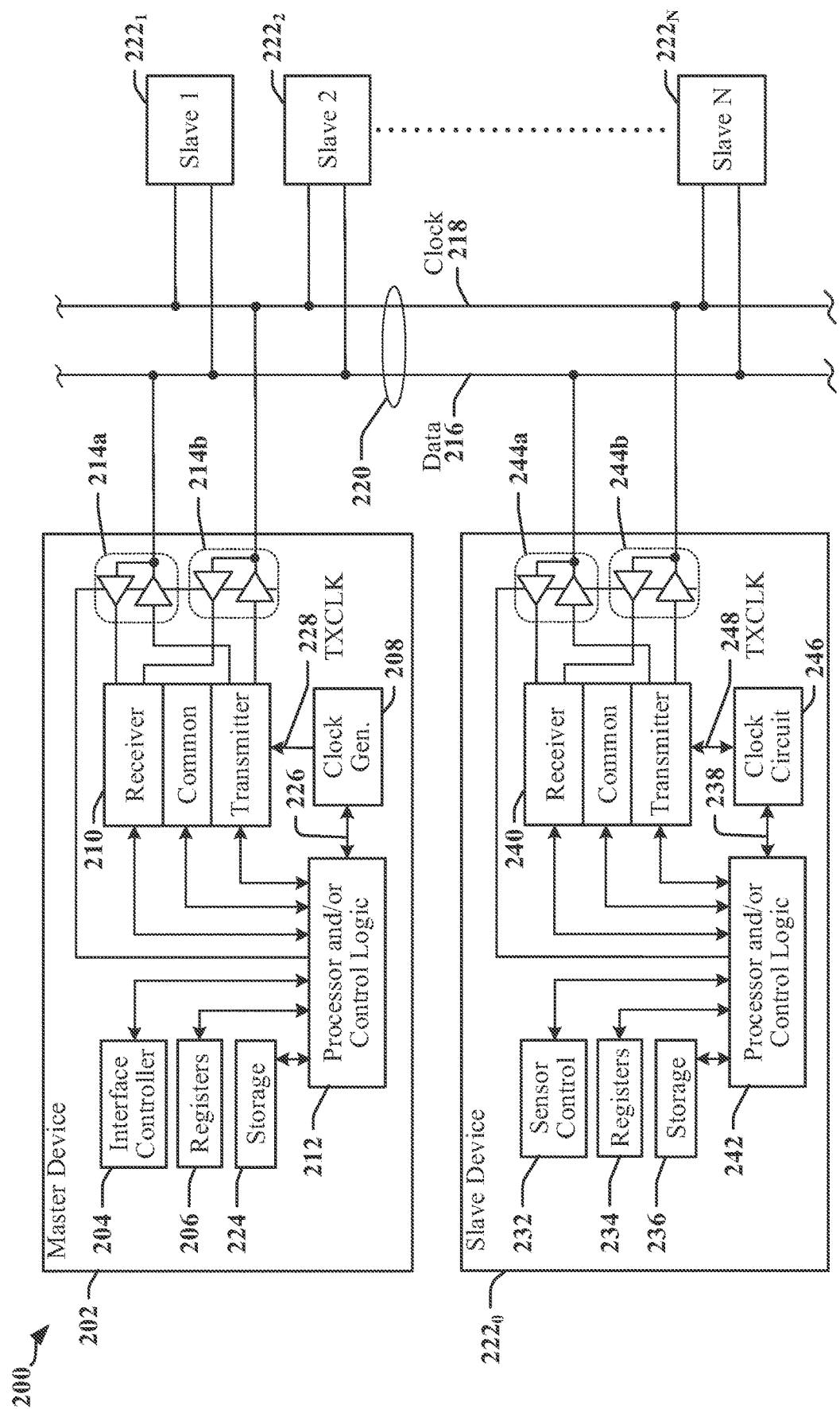
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as an application processor, SoC or ASIC. In various implementations the devices 202 and $222_0$-$222_N$ may include, support or operate as a modem, a signal processing device, a display driver, a camera, a user interface, a sensor, a sensor controller, a media player, a transceiver, and/or other such components or devices. In some examples, one or more of the slave devices $222_0$-$222_N$ may be used to control, manage or monitor a sensor device. Communications between devices 202 and $222_0$-$222_N$ over the serial bus 220 is controlled by a bus master 202. Certain types of bus can support multiple bus masters 202.

In one example, a master device 202 may include an interface controller 204 that may manage access to the serial bus, configure dynamic addresses for slave devices $222_0$-$222_N$ and/or generate a clock signal 228 to be transmitted on a clock line 218 of the serial bus 220. The master device 202 may include configuration registers 206 or other storage 224, and other control logic 212 configured to handle protocols and/or higher level functions. The control logic 212 may include a processing circuit having a processing device such as a state machine, sequencer, signal processor or general-purpose processor. The master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device $222_0$ configured to operate as a slave device may provide a control function, module or circuit 232 that includes circuits and modules to support a display, an image sensor, and/or circuits and modules that control and communicate with one or more sensors that measure environmental conditions. The slave device $222_0$ may include configuration registers 234 or other storage 236, control logic 242, a transceiver 240 and line drivers/receivers 244a and 244b. The control logic 242 may include a processing circuit having a processing device such as a state machine, sequencer, signal processor or general-purpose processor. The transceiver 210 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 228 may be derived from a signal received from the clock line 218. Other timing clocks 238 may be used by the control logic 242 and other functions, circuits or modules.

The serial bus 220 may be operated in accordance with RFFE, I2C, I3C, SPMI, or another protocol. At least one device 202, $222_0$-$222_N$ may be configured to operate as a master device on the serial bus 220. Two or more devices 202, $222_0$-$222_N$ may be configured to operate as a master device on the serial bus 220.

In some implementations, the serial bus 220 may be operated in accordance with an I3C protocol. Devices that communicate using the I3C protocol can coexist on the same serial bus 220 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 220, in addition to data formats and aspects of bus control. In some aspects, the I2C and I3C protocols may define direct current (DC) characteristics affecting certain signal levels associated with the serial bus 220, and/or alternating current (AC) characteristics affecting certain timing aspects of signals transmitted on the serial bus 220. In some examples, a 2-wire serial bus 220 transmits data on a data line 216 and a clock signal on the clock line 218. In some instances, data may be encoded in the signaling state, or transitions in signaling state of the data line 216 and the clock line 218.

Figure 3:
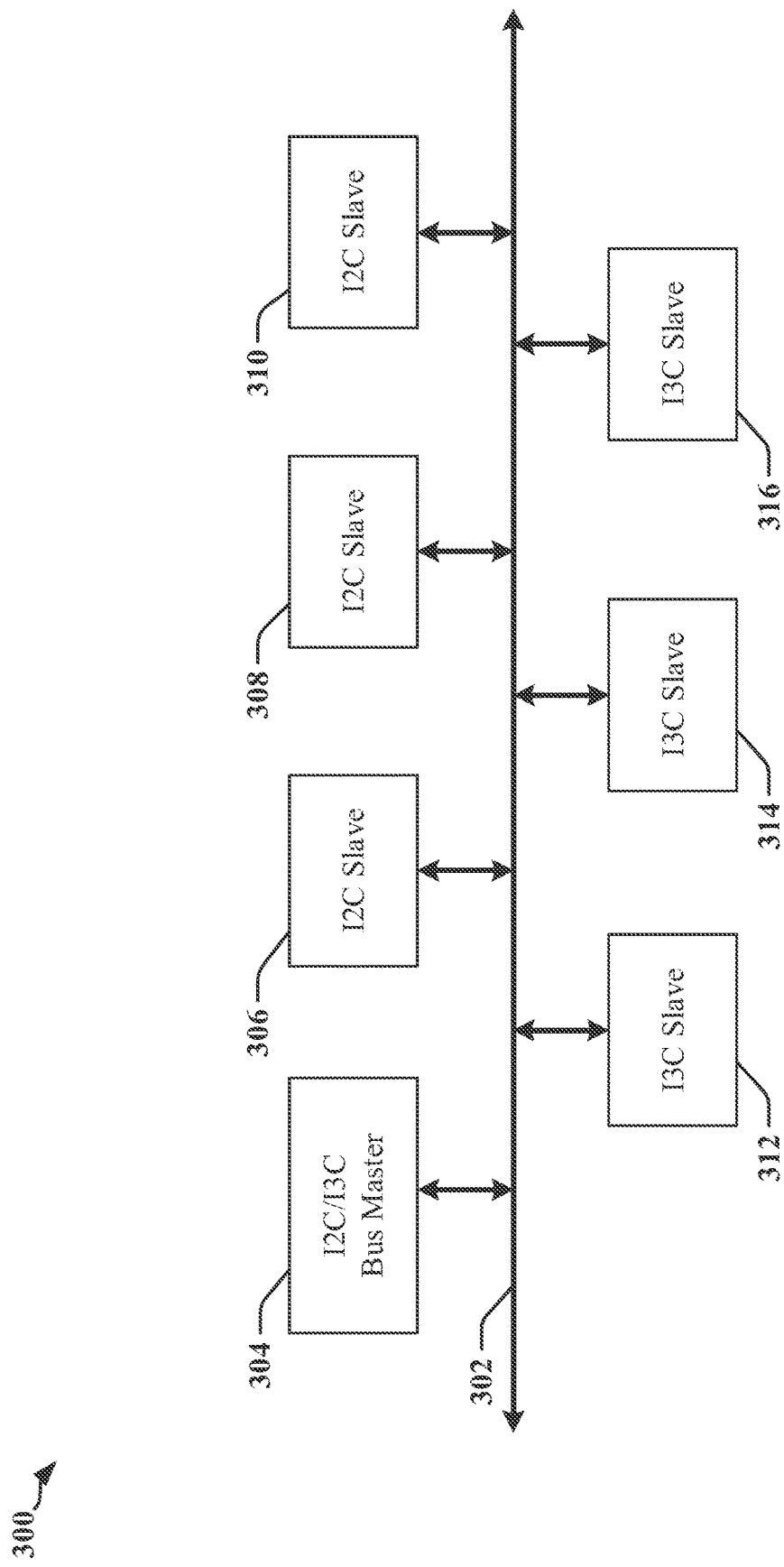
FIG. 3 illustrates a configuration of devices coupled to a common serial bus.

FIG. 3 illustrates an apparatus 300 in which a variety of devices 304, 306, 308, 310, 312, 314 and 316 are connected to a serial bus 302, and in which I3C devices 304, 312, 314 and 316 may be adapted or configured to obtain higher data transfer rates over the serial bus 302 using I3C protocols. The I3C devices 304, 312, 314 and 316 may coexist with conventionally configured I2C devices 306, 308, and 310. The I3C devices 304, 312, 314 and 316 may alternatively or additionally communicate using conventional I2C protocols, as desired or needed.

The serial bus 302 may be operated at higher data transfer rates when a master device 304 operates as an I3C bus master when controlling the serial bus 302. In the depicted example, a single master device 304 may serve as a bus master in I2C mode and in an I3C mode that supports a data transfer rate that exceeds the data transfer rate achieved when the serial bus 302 is operated according to a conventional I2C protocol. The signaling used for higher data-rate traffic may take advantage of certain features of I2C protocols such that the higher data-rate traffic can be carried over the serial bus 302 without compromising the functionality of legacy I2C devices 306, 308, 310 and 312 coupled to the serial bus 302.

Signaling in a Serial Bus

Figure 4:
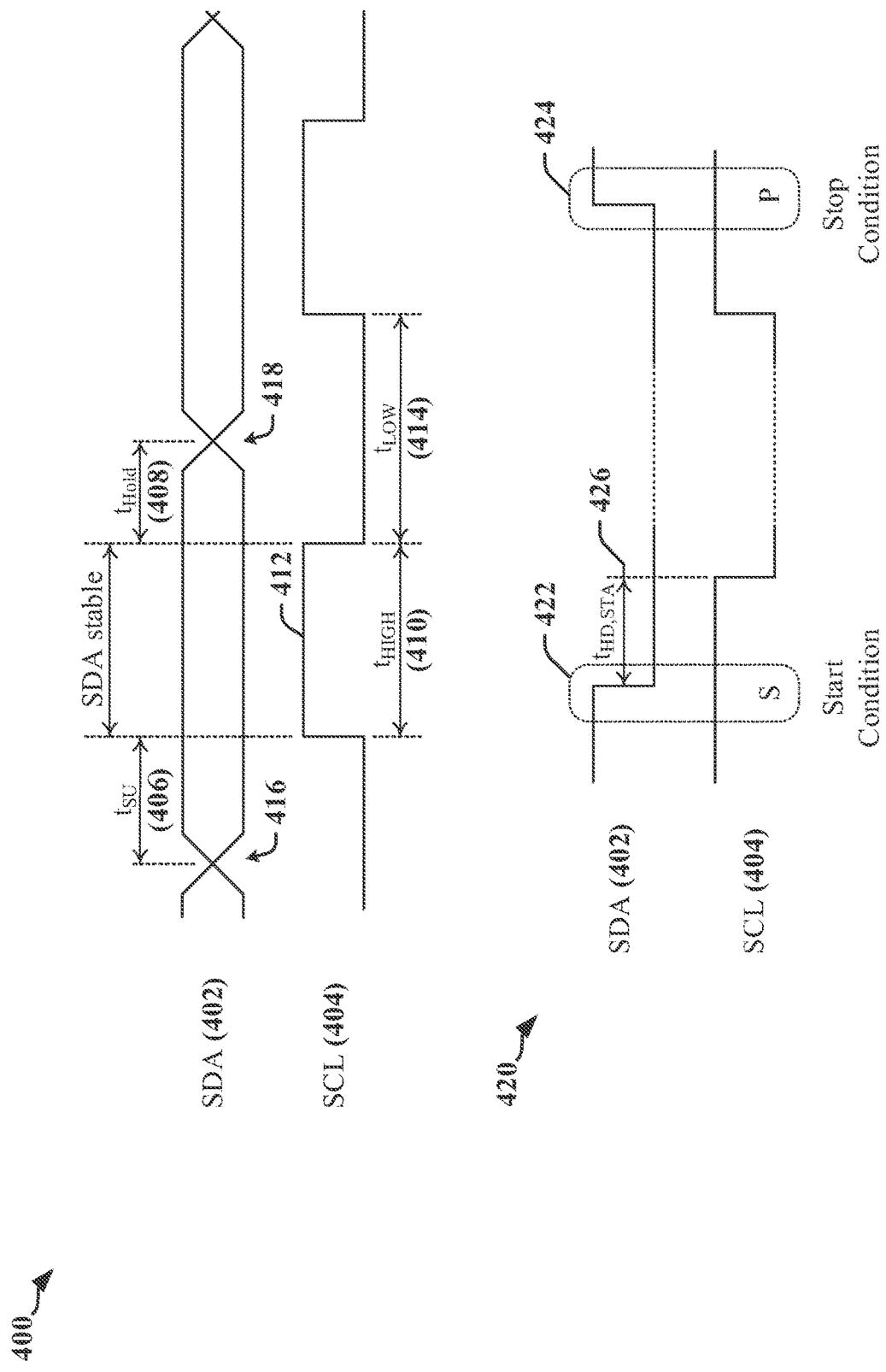
FIG. 4 illustrates certain aspects of the timing relationship between SDA and SCL wires on a conventional I2C bus.

Certain signaling defined in I3C specifications is derived from or otherwise based on I2C protocols. FIG. 4 includes timing diagrams 400 and 420 that illustrate the relationship between the SDA wire 402 and the SCL wire 404 on a conventional I2C bus. The first timing diagram 400 illustrates the timing relationship between the SDA wire 402 and the SCL wire 404 while data is being transferred on the conventionally configured I2C bus. The SCL wire 404 provides a series of pulses that can be used to sample data in the SDA wire 402. The pulses (including the pulse 412, for example) may be defined as the time during which the SCL wire 404 is determined to be in a high logic state at a receiver. When the SCL wire 404 is in the high logic state during data transmission, data on the SDA wire 402 is required to be stable and valid; the state of the SDA wire 402 is not permitted to change when the SCL wire 404 is in the high logic state.

Specifications for conventional I2C protocol implementations (which may be referred to as "I2C Specifications") define a minimum duration 410 ($t_{HIGH}$) of the high period of the pulse 412 on the SCL wire 404. The I2C Specifications also define minimum durations for a setup time 406 ($t_{SU}$) before occurrence of the pulse 412, and a hold time 408 ($t_{Hold}$) after the pulse 412 terminates. The signaling state of the SDA wire 402 is expected to be stable during the setup time 406 and the hold time 408. The setup time 406 defines a maximum time period after a transition 416 between signaling states on the SDA wire 402 until the arrival of the rising edge of the pulse 412 on the SCL wire 404. The hold time 408 defines a minimum time period after the falling edge of the pulse 412 on the SCL wire 404 until a next transition 418 between signaling states on the SDA wire 402. The I2C Specifications also define a minimum duration 414 for a low period ($t_{LOW}$) for the SCL wire 404. The data on the SDA wire 402 is typically stable and/or can be captured for the duration 410 ($t_{HIGH}$) when the SCL wire 404 is in the high logic state after the leading edge of the pulse 412.

The second timing diagram 420 of FIG. 4 illustrates signaling states on the SDA wire 402 and the SCL wire 404 between data transmissions on a conventional I2C bus. The I2C protocol provides for transmission of 8-bit data (bytes) and 7-bit addresses. A receiver may acknowledge transmissions by driving the SDA wire 402 to the low logic state for one clock period. The low signaling state represents an acknowledgement (ACK) indicating successful reception and a high signaling state represents a negative acknowledgement (NACK) indicating a failure to receive or an error in reception.

A START condition 422 is defined to permit the current bus master to signal that data is to be transmitted. The START condition 422 occurs when the SDA wire 402 transitions from high to low while the SCL wire 404 is high. The I2C bus master initially transmits the START condition 422, which may be also be referred to as a start bit, followed by a 7-bit address of an I2C slave device with which it wishes to exchange data. The address is followed by a single bit that indicates whether a read or write operation is to occur. The addressed I2C slave device, if available, responds with an ACK bit. If no I2C slave device responds, the I2C bus master may interpret the high logic state of the SDA wire 402 as a NACK. The master and slave devices may then exchange bytes of information in frames, in which the bytes are serialized such that the most significant bit (MSB) is transmitted first. The transmission of the byte is completed when a STOP condition 424 is transmitted by the I2C master device. The STOP condition 424 occurs when the SDA wire 402 transitions from low to high while the SCL wire 404 is high. The I2C Specifications require that all transitions of the SDA wire 402 occur when the SCL wire 404 is low, and exceptions may be treated as a START condition 422 or a STOP condition 424.

Figure 5:
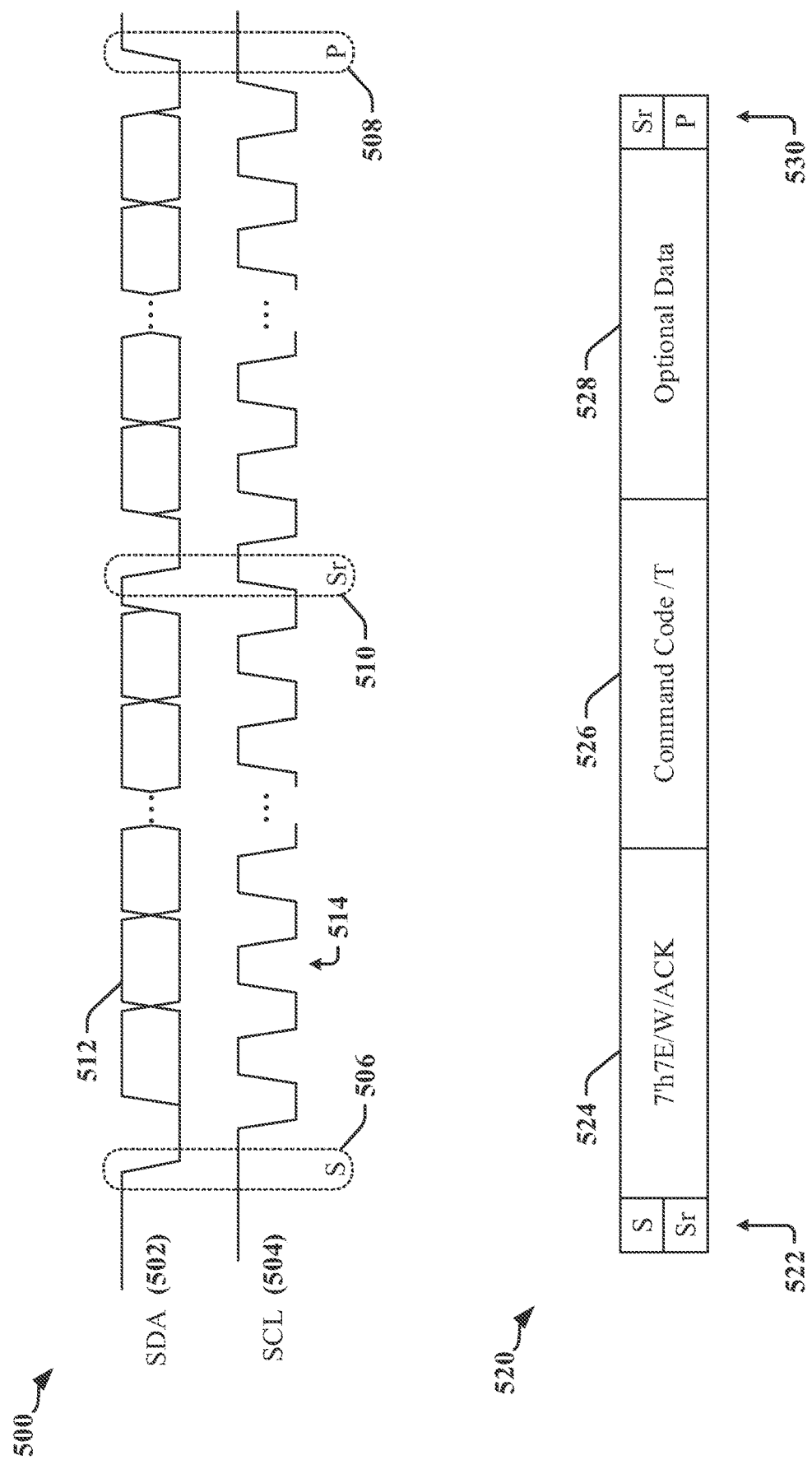
FIG. 5 includes a timing diagram that illustrates signaling on a serial bus when the serial bus is operated in a single data rate (SDR) mode of operation defined by I3C specifications.

FIG. 5 includes a timing diagram 500 that illustrates signaling on a serial bus when the serial bus is operated in a single data rate (SDR) mode of operation defined by I3C specifications. Data transmitted on a first wire (the data wire or SDA 502) of the serial bus may be captured using a clock signal transmitted on a second wire (the clock wire or SCL 504) of the serial bus. During data transmission, the signaling state 512 of SDA 502 is expected to remain constant for the duration of the pulses 514 when SCL 504 is at a high voltage level. Transitions on SDA 502 when SCL 504 is at the high voltage level indicate a START condition 506, a STOP condition 508 or a repeated START 510.

On an I3C serial bus, a START condition 506 is defined to permit the current bus master to signal that data is to be transmitted. The START condition 506 occurs when SDA 502 transitions from high to low while SCL 504 is high. The bus master may signal completion and/or termination of a transmission using a STOP condition 508. The STOP condition 508 is indicated when SDA 502 transitions from low to high while SCL 504 is high. A repeated START 510 may be transmitted by a bus master that wishes to initiate a second transmission upon completion of a first transmission. The repeated START 510 is transmitted instead of a STOP condition 508, and has the significance of a STOP condition 508 followed immediately by a START condition 506. The repeated START 510 occurs when SDA 502 transitions from high to low while SCL 504 is high.

The bus master may transmit an initiator 522 that may be a START condition 506 or a repeated START 510 prior to transmitting an address of a slave, a command, and/or data. FIG. 5 illustrates a command code transmission 520 by the bus master. The initiator 522 may be followed in transmission by a predefined command 524 indicating that a command code 526 is to follow. The command code 526 may, for example, cause the serial bus to transition to a desired mode of operation. In some instances, data 528 may be transmitted. The command code transmission 520 may be followed by a terminator 530 that may be a STOP condition 508 or a repeated START 510.

Interrupt Mechanisms for a Serial Bus

I3C devices may use in-band interrupts to alert other parts of a system and/or seek attention from a processor. In-band interrupts are asserted through combinations of signaling on the I3C bus and the use of In-band interrupts can reduce the number of physical general-purpose input/output pins used by a device, thereby reducing cost and complexity. I3C specifications define in-band interrupt, discovery, enumeration and dynamic address allocation procedures, which are typically performed in an I2C-compatible SDR mode of operation. In-band interrupts and associated arbitration processes may be performed during transmission of certain address headers. I3C protocols provide for address headers to be transmitted after a START condition 506 or a repeated START 510. I3C protocols limit assertion of in-band interrupts and associated arbitration processes to address headers transmitted after a START condition 506, including START conditions 506 initiated by a device other than the current bus master device.

Figure 6:
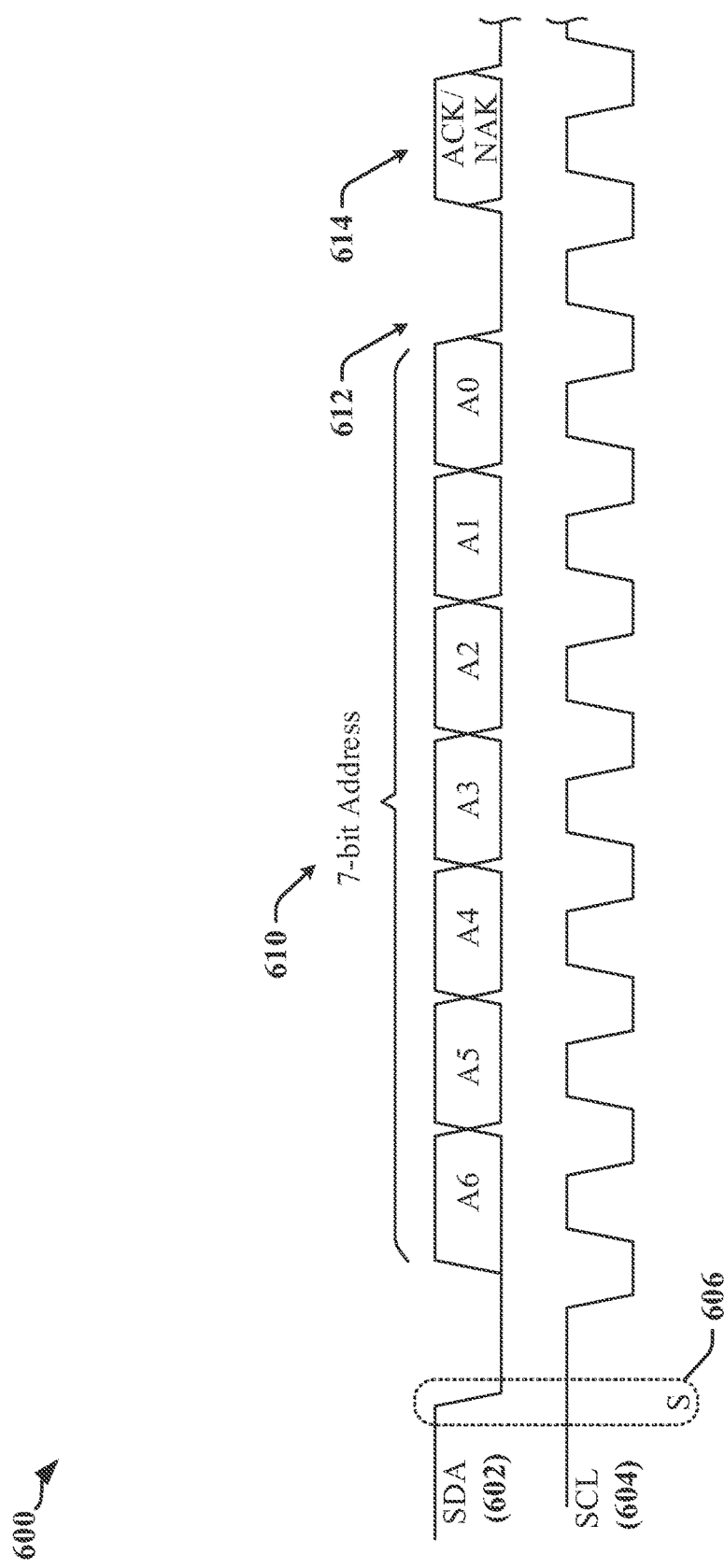
FIG. 6 illustrates timing associated with an address header provided on a serial bus operated in accordance with I3C protocols.

FIG. 6 is a diagram 600 that illustrates an example of the timing associated with an arbitrable address header provided on a serial bus in accordance with I3C protocols. In one example, a master device may initiate the transaction by initiating a START condition 606 on the serial bus, whereby the master device drives SDA 602 from high to low while SCL 604 remains high. In another example, a slave device desiring to assert an interrupt may initiate the START condition 606 by driving SDA 602 from high to low after SCL 604 has been high for some period of time. The master device completes the START condition 606 by driving SCL 604 low. The master device then transmits a clock signal on SCL 604 to control timing of the subsequent transmissions of SDA 602. By protocol, a seven-bit slave address 610 is transmitted on SDA 602 after the START condition 606. When no interrupt is asserted, the master device may transmit a command that includes a seven-bit slave address 610 followed by a Write/Read command bit 612, which indicates a write to the slave when low and a read from the slave when high. The slave device may respond by driving the SDA 602 low as an acknowledgment (ACK) in the next clock interval (ACK/NACK 614). If the slave device does not respond, the SDA 602 is pulled high and the master device treats the lack of response as a negative acknowledgment (NACK), in which case the master device may terminate the transaction with a STOP condition.

A slave device may contend for access to the serial bus by participating in a bus arbitration process when an address header is transmitted after the START condition 606. A slave device may drive SDA 602 low to initiate the START condition 606 while the serial bus is idle. The serial bus is idle after a STOP condition has been transmitted and before the START condition 606 is transmitted. Regardless of identity of the initiator, the master device drives SCL 604 low to complete the START condition 606 and to initiate arbitration. The slave device releases SDA 602 and commences arbitration provided SDA 602 remains high for some period of time. The line driver coupling the bus master to SDA 602 is in open-drain mode during the bus arbitration procedure. The bus arbitration procedure includes an enumeration phase to identify slave devices that have asserted an in-band interrupt, or are otherwise requesting interrupt service. The use of open-drain mode to permits multiple slave devices to drive SDA 602 in order to identify the highest priority device requesting interrupt service.

One or more slave devices may drive SDA 602 after the SCL 604 is driven low in order to transmit their respective addresses. The START condition 606 and at least the first Address bit, as well as ACK/NACK 614 are issued on SDA 602 in open-drain mode such that multiple line drivers may be active during arbitration. The master device may have placed its line drivers in open-drain mode before driving SCL 604 low, and both SDA 602 and SCL 604 are pulled up to a high voltage level when the serial bus is idle using a pull-up resistor or the like. Any device that has a high-priority message or pending request for service may assert an in-band interrupt request.

The arbitration process is decided based on value of the seven-bit slave address 610, which define priority of the slave devices. A lower-value slave address provides its associated slave device with higher priority than a higher-value slave address. Each slave device transmits its slave address on SDA 502, commencing with the most significant bit (A[6]), and may continue transmitting address bits until another slave device overrides the transmitted bit. An address bit that is set to logic '0' causes a line driver in a slave to actively pull SDA 502 low, whereas an address bit that is set to logic '1' is transmitted when the pull-up resistor pulls SDA 502 high. Accordingly, a lower value bit overrides a higher value bit. The highest priority device has the lowest address and can successfully transmit its slave address, winning the arbitration process because it is the first device to drive SDA 602 low while lower-priority devices would have left SDA 602 high.

In certain applications, a slave device may be unable to win an in-band interrupt arbitration process in a timely manner. A slave device may be blocked from winning the arbitration process indefinitely due to the presence of one or more other devices that have been assigned higher priority, where each device is continually demanding access to the serial bus such that the lower-priority slave device is starved of service over the serial bus. The lower-priority slave device may have no ability to transmit a request and/or data due to starvation.

Certain aspects disclosed herein provide techniques whereby a lower-priority slave device can effectively acquire higher priority after participating in a configured maximum number of unsuccessful arbitration processes, and/or after a maximum delay in obtaining service through an in-band interrupt. These techniques may be implemented without compromising the ability of legacy devices to operate on the serial bus.

In one example, a bus master device may reserve certain higher priority dynamic addresses to enable temporary elevation of slave devices to a higher priority tier. Dynamic addresses are assigned during an enumeration process that is performed during system initialization and/or after one or more devices become active on an I3C bus. Various devices may be assigned a static address during device manufacture or system assembly. When a slave device goes active on the I3C bus, the current bus master may assign a dynamic address to the slave device in accordance with policies set by an application and/or during system configuration.

In accordance with certain aspects disclosed herein, the bus master device may assign dynamic addresses commencing at designated starting slave address. In one example, the bus master device may assign dynamic addresses in the range 0x3F-0xFF, reserving lower addresses for uses that include enabling urgent interrupts.

Figure 7:
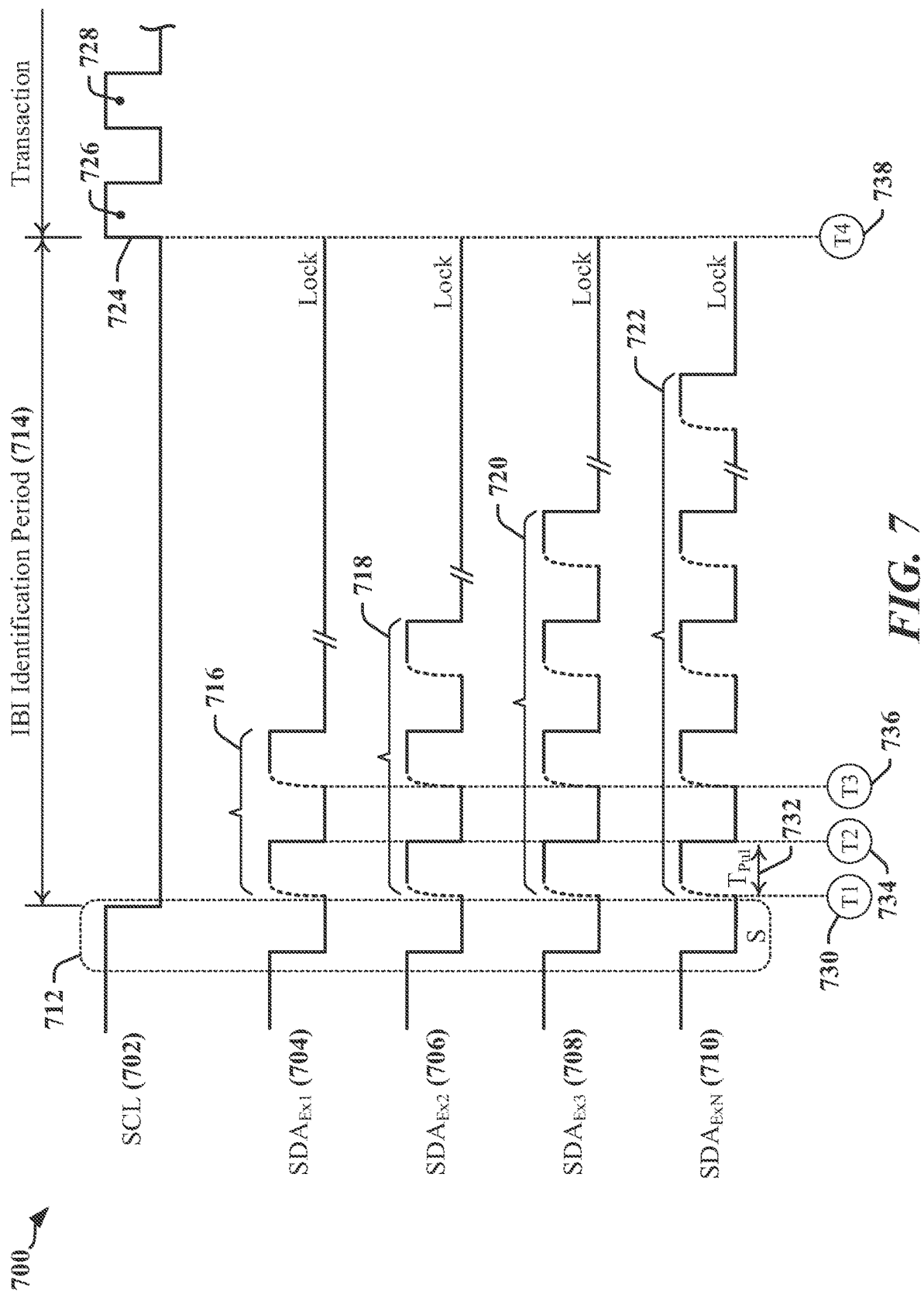
FIG. 7 illustrates the operation of an urgent interrupt technique provided in accordance with certain aspects disclosed herein.

FIG. 7 illustrates an example of the operation of an urgent interrupt capability provided in accordance with certain aspects disclosed herein. The timing diagrams 700 relate to the operation of an I3C bus when a slave device acquires higher priority and/or is promoted to a higher tier of priority for participating in in-band interrupt arbitration. In the example, a START condition 712 has been provided on the serial bus. The START condition 712 may have been initiated by a bus master or may have been initiated by a slave device while the serial bus was idle. The START condition 712 is initiated when SDA 704, 706, 708, 710 is driven low while the while SCL 702 is high. The START condition 712 is completed when the bus master drives SCL 702 low.

According to certain aspects, the bus master may be adapted to delay transmission of clock pulses 726, 728 for a period of time after completing the START condition 712 to provide an in-band interrupt identification period 714 sufficient to identify any urgent interrupt requests. In a conventional in-band interrupt, a requesting slave device releases SDA 704, 706, 708, 710 and/or monitors the serial bus after the START condition 712 to determine whether SDA 704, 706, 708, 710 returns to the high state (e.g., at time T1 730), indicating that an address arbitration may proceed.

A slave device may be adapted to assert an urgent interrupt request by driving SDA 704, 706, 708, 710 low at time T2 734 after SDA 704, 706, 708, 710 has returned to the high state following the START condition 712 and before the first clock pulse 726 is transmitted on SCL 702. Driving SDA 704, 706, 708, 710 low at time T2 734 produces a pulse of width $T_{Pul}$ 732 on SDA 704, 706, 708, 710. The master device detects SDA 704, 706, 708, 710 low and determines that an urgent interrupt is being requested. The master device may initiate a timer or counter that is used to further delay transmission of the clock pulses 726, 728. The slave device may release SDA 704, 706, 708, 710 at time T3 736 and SDA 704, 706, 708, 710 is pulled high by a pullup resistor coupled to SDA 704, 706, 708, 710 during open-drain mode operation. An urgent interrupt identification and arbitration process follows.

Each device seeking urgent interrupt service attempts to provide a number of pulses on SDA 704, 706, 708, 710 before the master device resumes transmission of clock pulses 726, 728 over SCL 702. The number of clock pulses transmitted on SDA 704, 706, 708, 710 indicates the slave device that should be serviced first. FIG. 7 provides four examples, each example related to a different number of pulse counts transmitted by slave devices that have been assigned different priorities. In the first example, a group of two pulses 716 is transmitted on SDA 704. In the second example, a group of three pulses 718 is transmitted on SDA 706. In the third example, a group of four pulses 720 is transmitted on SDA 708. The fourth example relates to any number (N) of pulses 722 is transmitted on SDA 710.

Slave devices provide pulses on SDA 704, 706, 708, 710 by releasing SDA 704, 706, 708, 710 and allowing the pullup resistor to pull SDA 704, 706, 708, 710 high. When a slave device successfully provides its associated number of pulses, it drives SDA 704, 706, 708, 710 low until the rising edge 724 of the first clock pulse 726 on SCL 702 is detected. The successful slave device locks out any remaining slave devices that are seeking urgent interrupt service by suppressing further pulses on SDA 704, 706, 708, 710. These other devices detect the suppression of at least one pulse and may discontinue participating in the urgent interrupt identification and arbitration process.

The master device may begin transmission of clock pulses 726, 728 over SCL 702 at time T4 738, terminating the in-band interrupt identification period 714. The duration of the in-band interrupt identification period 714 may be variable, fixed and/or limited by configuration. In one example, the in-band interrupt identification period 714 has a fixed duration and commences at T1 730 when SDA 704, 706, 708, 710 transitions high after the START condition 712 and ends at T4 738. In another example, the in-band interrupt identification period 714 has a fixed duration commencing at T2 734, when SDA 704, 706, 708, 710 is pulled low to indicate an urgent interrupt request. In another example, the in-band interrupt identification period 714 is variable and based on a timer or counter that is restarted at every pulse detected on SDA 704, 706, 708, 710. In the latter example, the timer or counter may be restarted on a positive-going or negative-going edge of each pulse detected on SDA 704, 706, 708, 710 in order to provide a delay between transmission of the last pulse and commencement of transmission of clock pulses 726, 728 on SCL 702. A variable in-band interrupt identification period 714 may be limited to a maximum duration defined by configuration.

The number of pulses transmitted on SDA 704, 706, 708, 710 during the in-band interrupt identification period 714 may indicate a slave identifier of the device winning the urgent interrupt identification and arbitration process. In some implementations, the number of pulses transmitted on SDA 704, 706, 708, 710 during the in-band interrupt identification period 714 may convey additional information. For example, the number of pulses transmitted on SDA 704, 706, 708, 710 during the in-band interrupt identification period 714 may indicate or specify a responsive action to be taken by the master device. In some instances, the responsive action may include a device read from one or more preconfigured register addresses. The responsive action may include a device write to one or more preconfigured register addresses.

A configuration table provided in the master device may associate numbers of pulses with a dynamically assigned slave address, and may further indicate one or more actions to be taken in response to a request for urgent interrupt service from the requesting slave device. The configuration table may be provided by an application, during system configuration and/or during device initialization.

A configuration table provided in the slave device may identify one or more identities that are available for the use of the slave device in an urgent interrupt identification and arbitration process. The identities may be associated with a numbers of pulses to be transmitted on SDA 704, 706, 708, 710 during the in-band interrupt identification period 714. The slave device may select identity based on one or more desired actions to be taken in response to a request for urgent interrupt service. The configuration table may be populated by a master device as directed by an application, during system configuration and/or during device initialization.

Figure 8:
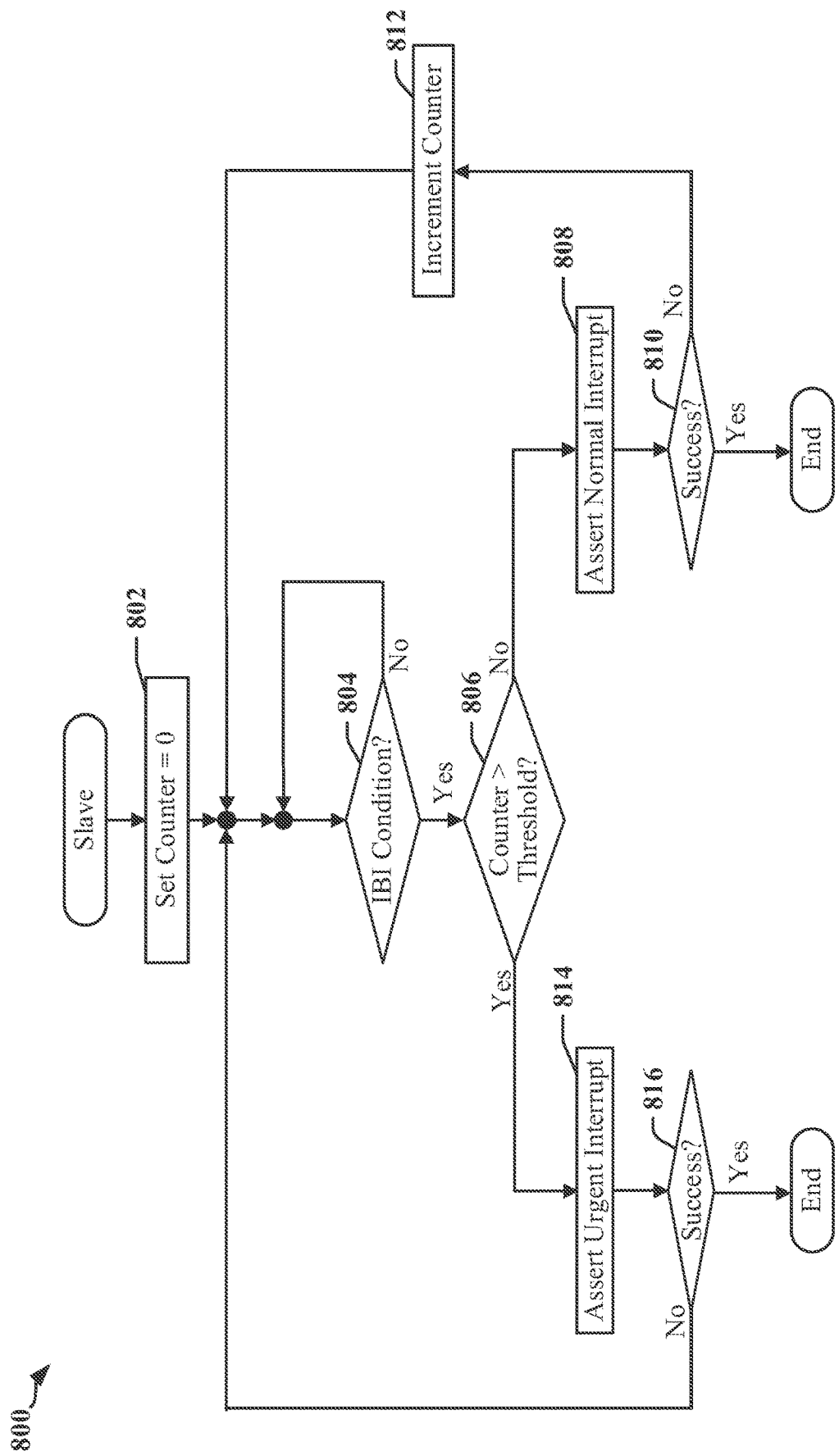
FIG. 8 is a flowchart illustrating certain aspects related to a request for interrupt service made by a slave device in accordance with certain aspects disclosed herein.

FIG. 8 is a flowchart 800 that illustrates certain aspects related to a request for interrupt service by a slave device. The flowchart 800 relates to certain functions and/or processes performed after the slave device has determined a need to request interrupt service from another device coupled to the slave device through a serial bus. The serial bus may be operated in accordance with an I3C protocol.

At block 802, the slave device may initiate an interrupt request counter that is used to trigger issuance of an urgent interrupt request. In the illustrated example, the interrupt request counter is set to zero and counts toward a threshold value. The interrupt request counter may be configured to count up or down. In the illustrated example, the interrupt request counter is configured to count upwards. At block 804, the slave device waits for an in-band interrupt opportunity. On a serial bus operated in accordance with an I3C protocol, the in-band interrupt opportunity occurs after a START condition 712 has been provided on the serial bus. In some instances, the in-band interrupt opportunity may be created by a slave device that drives SDA 704, 706, 708, 710 low when the serial bus is idle, thereby initiating a START condition 712. When an in-band interrupt opportunity arises, the slave device may assert an interrupt request and/or participate in arbitration commencing at block 806.

At block 806, the slave device may determine whether the interrupt request counter has reached or exceeded a threshold value. The interrupt request counter tracks the number of failures to win a conventional arbitration process. The threshold value may be configured to limit the number of unsuccessful attempts at obtaining conventional interrupt service. In other examples, the counter may operate as a timer that limits the maximum time allowed for attempting to obtain conventional interrupt service. When the interrupt request counter is less than the threshold value, then a conventional arbitration process is followed at block 808, where the slave device vies for interrupt service using its dynamically assigned slave address. If at block 810, it is determined that the slave device has won the conventional arbitration process and received service, then the slave returns to normal operation. If at block 810, it is determined that the slave device has lost the conventional arbitration process, then the slave device may increment the interrupt request counter at block 812 and return to block 804 to wait for another in-band interrupt opportunity.

When the interrupt request counter has reached or exceeded the threshold value, then the slave device may assert an urgent interrupt request and contend as necessary in an urgent interrupt identification and arbitration process at block 814. FIG. 7 illustrates one example of an urgent interrupt identification and arbitration process. If at block 816, it is determined that the slave device has won the urgent interrupt identification and arbitration process, and subsequently received service, then the slave returns to normal operation. If at block 816, it is determined that the slave device has lost the urgent interrupt identification and arbitration process, then the slave device may return to block 804 to wait for another in-band interrupt opportunity.

Figure 9:
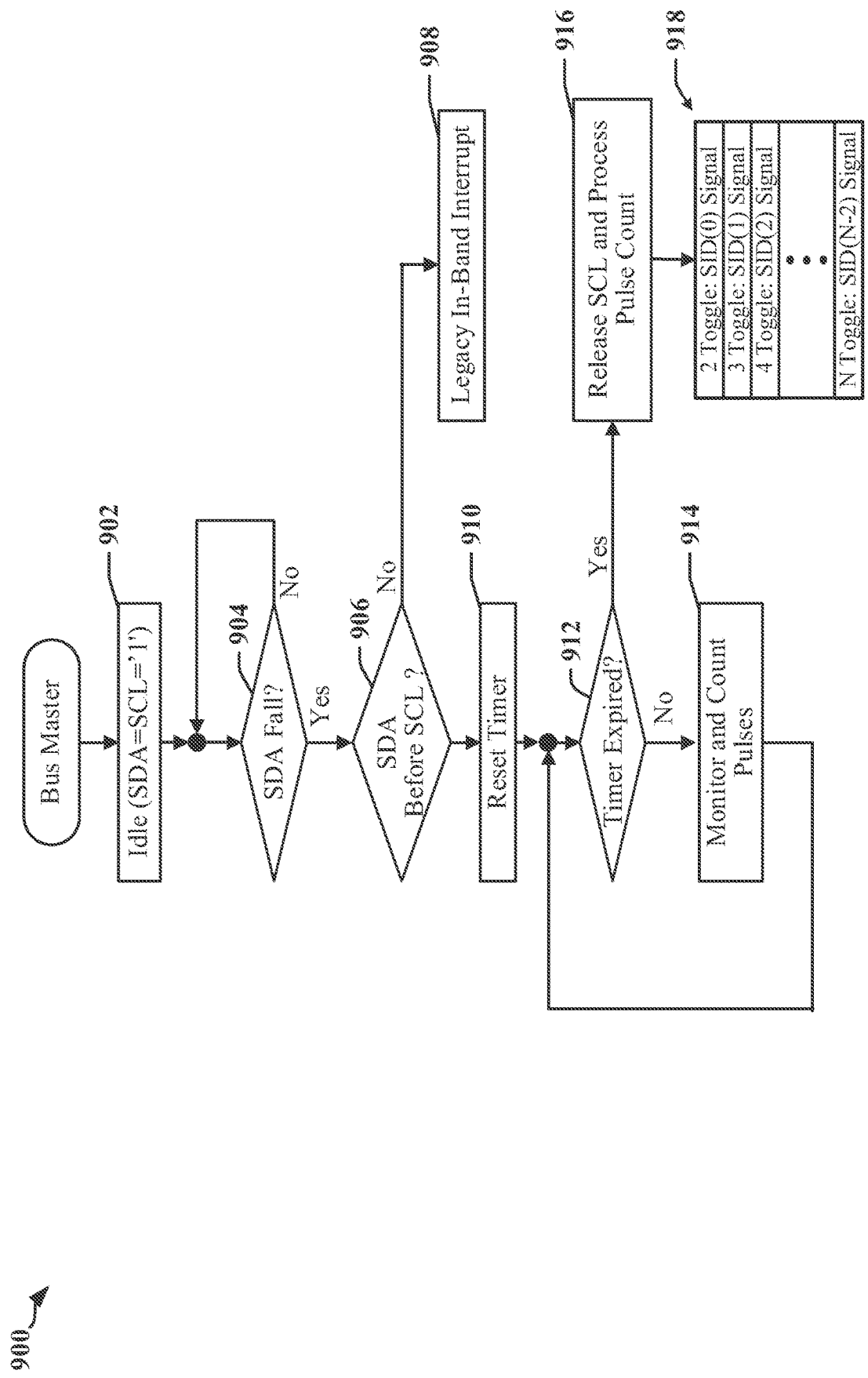
FIG. 9 is a flowchart illustrating certain aspects related to a request for interrupt service received at a bus master in accordance with certain aspects disclosed herein.

FIG. 9 is a flowchart 900 that illustrates certain aspects related to a request for interrupt service received at a bus master. The flowchart 900 relates to certain functions and/or processes performed after the bus master has determined that SDA 704, 706, 708, 710 has been driven low when the serial bus is idle at block 902. The bus master may drive SCL 702 low to complete a START condition 712 and provide an in-band interrupt opportunity. In some instances, the bus master initiates the START condition 712 to conduct a transaction over the serial bus. In other instances, a slave device initiates the START condition 712 to obtain interrupt service. The serial bus may be operated in accordance with an I3C protocol.

At block 904, the bus master may monitor the serial bus until SDA 704, 706, 708, 710 is driven low. When SDA 704, 706, 708, 710 is driven low, the bus master may drive SCL 702 low to complete the START condition 712. After SCL 702 is driven low, SDA 704, 706, 708, 710 is released and pulled high by a pullup resistor. The line drivers coupling the bus master and one or more slave devices to the serial bus are in open-drain mode at this point. The bus master may refrain from transmitting clock pulses on SCL 702 for a period of time. If the bus determines at block 906 that SDA 704, 706, 708, 710 remains high when a rising edge 724 of a first pulse 726 has been provided on SCL 702, then the bus master may initiate a conventional arbitration process at block 908. If the bus determines at block 906 that SDA 704, 706, 708, 710 has been driven low before a rising edge 724 of a first pulse 726 has been provided on SCL 702, then the bus master may proceed with an urgent interrupt identification and arbitration process, commencing at block 910.

At block 910, the bus master may reset a timer or counter that manages or controls a duration of an in-band interrupt identification period 714. The bus master may monitor the timer or counter at block 912 and, when the timer or counter has expired or reached a threshold value, the bus master may cause SCL 702 to transition high terminating the in-band interrupt identification period 714. The bus master may process a pulse count obtained during the in-band interrupt identification period 714.

Before the timer or counter has expired or reached a threshold value, the bus master may monitor the serial bus at block 914 to identify pulses on SDA 704, 706, 708, 710 and the bus master may maintain a count of pulses identified. In some examples, the bus master may reset the timer or counter that controls the in-band interrupt identification period 714 upon detection of each pulse on SDA 704, 706, 708, 710. In other instances, the duration of the in-band interrupt identification period 714 is fixed and commences when the timer or counter is reset at block 910.

The bus master may determine a slave address of the slave that won the urgent interrupt identification and arbitration process from the value of the pulse count. The bus master may use the pulse count to index or otherwise reference one or more tables 918 associating slave devices with pulse counts. The bus master may determine an action to be taken with reference to the winning slave device based on information provided in the one or more tables.

Examples of Processing Circuits and Methods

Figure 10:
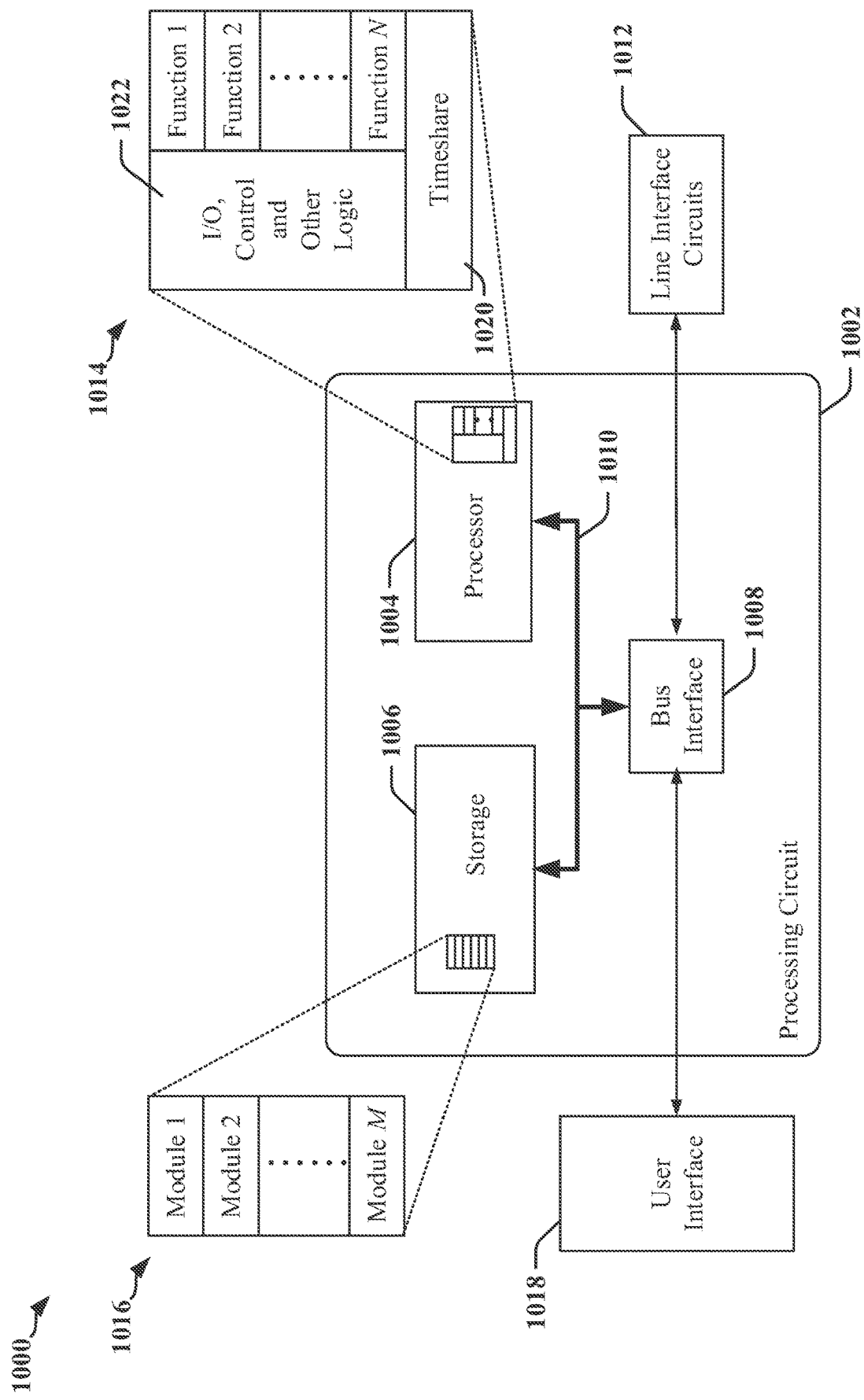
FIG. 10 is a block diagram illustrating an example of an apparatus employing a processing circuit that may be adapted according to certain aspects disclosed herein.

FIG. 10 is a diagram illustrating an example of a hardware implementation for an apparatus 1000 employing a processing circuit 1002 that may be configured to perform one or more functions disclosed herein. In accordance with various aspects of the disclosure, an element, or any portion of an element, or any combination of elements as disclosed herein may be implemented using the processing circuit 1002. The processing circuit 1002 may include one or more processors 1004 that are controlled by some combination of hardware and software modules. Examples of processors 1004 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1004 may include specialized processors that perform specific functions, and that may be configured, augmented or controlled by one of the software modules 1016. The one or more processors 1004 may be configured through a combination of software modules 1016 loaded during initialization, and further configured by loading or unloading one or more software modules 1016 during operation. In various examples, the processing circuit 1002 may be implemented using a state machine, sequencer, signal processor and/or general-purpose processor, or a combination of such devices and circuits.

In the illustrated example, the processing circuit 1002 may be implemented with a bus architecture, represented generally by the bus 1010. The bus 1010 may include any number of interconnecting buses and bridges depending on the specific application of the processing circuit 1002 and the overall design constraints. The bus 1010 links together various circuits including the one or more processors 1004, and storage 1006. Storage 1006 may include memory devices and mass storage devices, and may be referred to herein as computer-readable media and/or processor-readable media. The bus 1010 may also link various other circuits such as timing sources, timers, peripherals, voltage regulators, and power management circuits. A bus interface 1008 may provide an interface between the bus 1010 and one or more transceivers 1012. A transceiver 1012 may be provided for each networking technology supported by the processing circuit. In some instances, multiple networking technologies may share some or all of the circuitry or processing modules found in a transceiver 1012. Each transceiver 1012 provides a means for communicating with various other apparatus over a transmission medium. Depending upon the nature of the apparatus 1000, a user interface 1018 (e.g., keypad, display, speaker, microphone, joystick) may also be provided, and may be communicatively coupled to the bus 1010 directly or through the bus interface 1008.

A processor 1004 may be responsible for managing the bus 1010 and for general processing that may include the execution of software stored in a computer-readable medium that may include the storage 1006. In this respect, the processing circuit 1002, including the processor 1004, may be used to implement any of the methods, functions and techniques disclosed herein. The storage 1006 may be used for storing data that is manipulated by the processor 1004 when executing software, and the software may be configured to implement any one of the methods disclosed herein.

One or more processors 1004 in the processing circuit 1002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1006 or in an external computer-readable medium. The external computer-readable medium and/or storage 1006 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1006 may also include, by way of example, a carrier wave, a transmission line, and any other suitable medium for transmitting software and/or instructions that may be accessed and read by a computer. Computer-readable medium and/or the storage 1006 may reside in the processing circuit 1002, in the processor 1004, external to the processing circuit 1002, or be distributed across multiple entities including the processing circuit 1002. The computer-readable medium and/or storage 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1006 may maintain software maintained and/or organized in loadable code segments, modules, applications, programs, etc., which may be referred to herein as software modules 1016. Each of the software modules 1016 may include instructions and data that, when installed or loaded on the processing circuit 1002 and executed by the one or more processors 1004, contribute to a run-time image 1014 that controls the operation of the one or more processors 1004. When executed, certain instructions may cause the processing circuit 1002 to perform functions in accordance with certain methods, algorithms and processes described herein.

Some of the software modules 1016 may be loaded during initialization of the processing circuit 1002, and these software modules 1016 may configure the processing circuit 1002 to enable performance of the various functions disclosed herein. For example, some software modules 1016 may configure internal devices and/or logic circuits 1022 of the processor 1004, and may manage access to external devices such as the transceiver 1012, the bus interface 1008, the user interface 1018, timers, mathematical coprocessors, and so on. The software modules 1016 may include a control program and/or an operating system that interacts with interrupt handlers and device drivers, and that controls access to various resources provided by the processing circuit 1002. The resources may include memory, processing time, access to the transceiver 1012, the user interface 1018, and so on.

One or more processors 1004 of the processing circuit 1002 may be multifunctional, whereby some of the software modules 1016 are loaded and configured to perform different functions or different instances of the same function. The one or more processors 1004 may additionally be adapted to manage background tasks initiated in response to inputs from the user interface 1018, the transceiver 1012, and device drivers, for example. To support the performance of multiple functions, the one or more processors 1004 may be configured to provide a multitasking environment, whereby each of a plurality of functions is implemented as a set of tasks serviced by the one or more processors 1004 as needed or desired. In one example, the multitasking environment may be implemented using a timesharing program 1020 that passes control of a processor 1004 between different tasks, whereby each task returns control of the one or more processors 1004 to the timesharing program 1020 upon completion of any outstanding operations and/or in response to an input such as an interrupt. When a task has control of the one or more processors 1004, the processing circuit is effectively specialized for the purposes addressed by the function associated with the controlling task. The timesharing program 1020 may include an operating system, a main loop that transfers control on a round-robin basis, a function that allocates control of the one or more processors 1004 in accordance with a prioritization of the functions, and/or an interrupt driven main loop that responds to external events by providing control of the one or more processors 1004 to a handling function.

FIG. 11 is a flowchart 1100 illustrating a data communication method performed at a slave device coupled to a serial bus. The method relates to an in-band interrupt technique that enhances the priority of the slave device in order to increase the likelihood that the slave device can access the serial bus and/or acquire the attention of another device coupled to the serial bus.

At block 1102, the slave device may drive a data line (SDA) of an I3C serial bus from a high state to a low state before a first clock pulse is received from a clock line (SCL) of the I3C serial bus after a start condition has been provided on the I3C serial bus. In one example, the start condition may be initiated by a bus master. In another example, the start condition may be initiated by a device other than the bus master. In some instances, the slave device may initiate the start condition by driving SDA low while the bus is idle, as indicated when both SCL and SDA are high for some duration of time. After the start condition, SDA may return to the high state. Driving SDA from the high state to the low state produces an initial pulse on the data line.

At block 1104, the slave device may transmit one or more additional pulses on SDA before the first clock pulse is transmitted on SCL. The transmission of additional pulses is illustrated in four examples illustrated in FIG. 7. The number of pulses may be indicative of the source of an urgent interrupt request. For example, the slave device may be configured to transmit k pulses when asserting an urgent interrupt request, and a bus master that detects the k pulses transmitted in urgent interrupt request may be configured to identify the slave device based on an association between the number k and the unique address assigned to the slave device. The number of additional pulses (i.e., k−1) may be provided on SDA in accordance with configuration information maintained by the slave device.

At block 1106, the slave device may determine if all of the additional pulses have been successfully transmitted. One or more pulses may be suppressed by a higher-priority slave device that actively drives SDA low before all of the additional pulses have been transmitted. A higher-priority slave device attempts to transmit fewer pulses on SDA. For example, the higher-priority slave device may be configured to transmit k−1 pulses when asserting an urgent interrupt request. If each of the plurality of additional pulses has not been successfully transmitted on SDA, the slave device may wait for a next interrupt opportunity. The slave device may terminate transmission on SDA until another start condition is provided on the I3C serial bus after detecting that one of the plurality of additional pulses has been suppressed.

At block 1108, the slave device may drive SDA low until a rising edge of the first clock pulse is detected on SCL after each of the plurality of additional pulses has been successfully transmitted on SDA. Driving the data line low may suppress a pulse transmitted on the data line by one or more other slave devices.

In one example, the slave device may cause a line driver coupling the slave device to SDA to enter an open-drain mode of operation before driving the data line from the high state to the low state.

After the plurality of additional pulses has been successfully transmitted on SDA slave device may participate in an interrupt service activity after each of the plurality of additional pulses has been successfully transmitted on the data line. The interrupt service activity may include a register read operation. The interrupt service activity may include a register write operation. The interrupt service activity may cause a bus master to reconfigure a feature of the slave device.

In certain examples, the slave device may initiate an urgent in-band interrupt request after participating unsuccessfully a number of interrupt service arbitration procedures that exceeds a threshold maximum number of interrupt service arbitration procedures defined for the slave device. The urgent in-band interrupt request is initiated by driving the data line from the high state to the low state before the first clock pulse is received from the clock line. The unsuccessful interrupt service arbitration procedures may be conducted in accordance with conventional I3C protocols. The slave device may be configured to assert an urgent interrupt request after a number of failed interrupt service arbitrations and/or after a maximum period of time has elapsed. The slave device may participate in an urgent interrupt identification and arbitration process after initiating the urgent in-band interrupt request. The urgent interrupt identification and arbitration process may be decided based on number of plurality of additional pulses associated with each device participating in the urgent interrupt identification and arbitration process.

Figure 12:
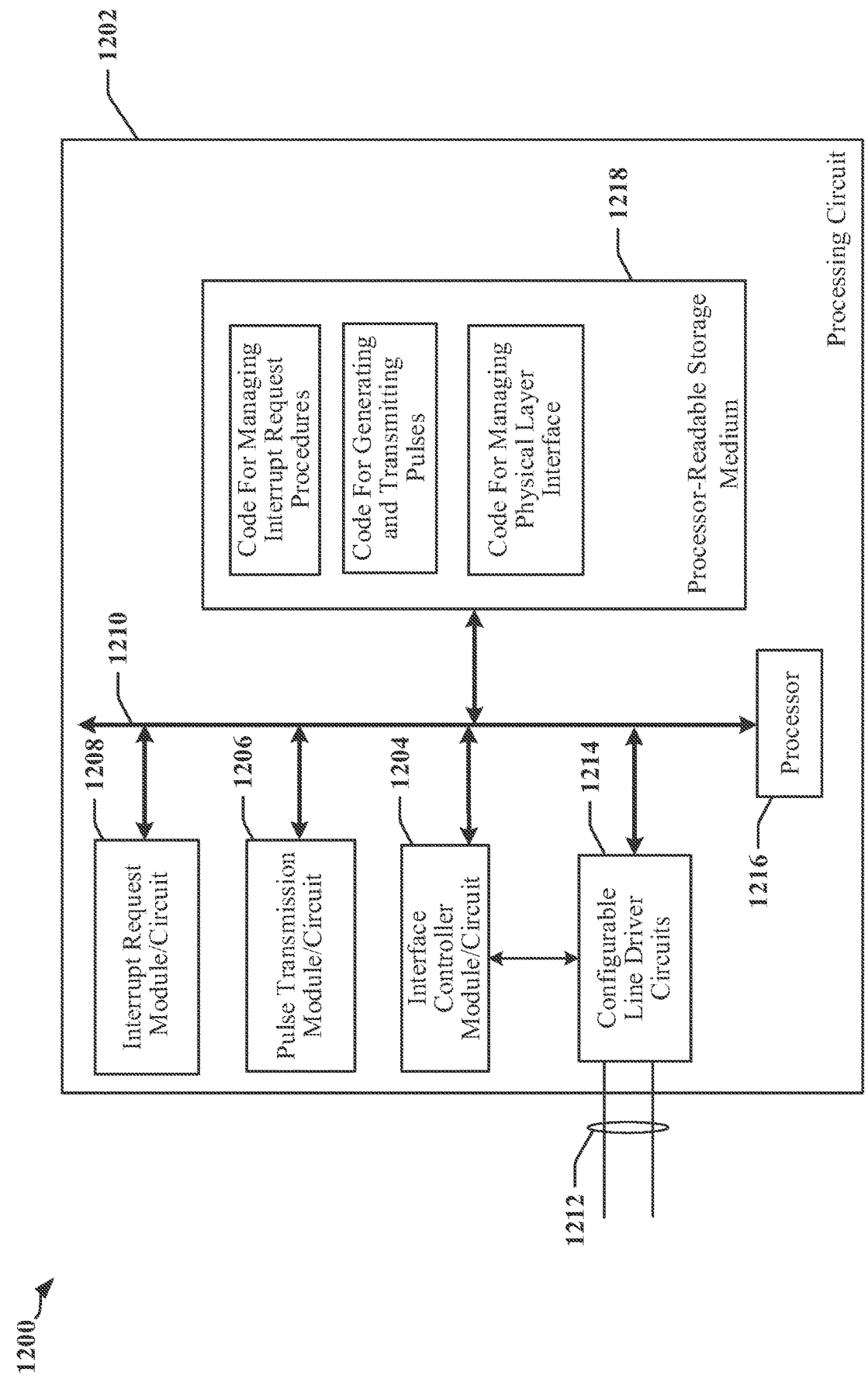
FIG. 12 illustrates a hardware implementation for a slave apparatus operated in accordance with certain aspects disclosed herein.

FIG. 12 is a diagram illustrating a simplified example of a hardware implementation for an apparatus 1200 employing a processing circuit 1202. The processing circuit typically has a controller or processor 1216 and/or may include one or more microprocessors, microcontrollers, digital signal processors, sequencers and/or state machines. The processing circuit 1202 may be implemented with a bus architecture, represented generally by the bus 1210. The bus 1210 may include any number of interconnecting buses and bridges depending on the specific application of the processing circuit 1202 and the overall design constraints. The bus 1210 links together various circuits including one or more processors and/or hardware modules, represented by the controller or processor 1216, the modules or circuits 1204, 1206 and 1208, and the processor-readable storage medium 1218. The apparatus may be coupled to a multi-wire communication link using a physical layer circuit 1214 that includes configurable line drivers. The configurable line drivers may operate in multiple modes, including push-pull and open-drain modes, unidirectional and bidirectional modes and high-impedance (disabled) modes. The physical layer circuit 1214 may be coupled to the multi-wire communication link 1212 to support communications in accordance with an I3C protocol, for example. The bus 1210 may also link various other circuits such as timing sources, peripherals, voltage regulators, and power management circuits, which are well known in the art, and therefore, will not be described any further.

The processor 1216 is responsible for general processing, including the execution of software, code and/or instructions stored on the processor-readable storage medium 1218. The computer-readable storage medium may include a non-transitory storage medium. The software, when executed by the processor 1216, causes the processing circuit 1202 to perform the various functions described supra for any particular apparatus. The computer-readable storage medium may be used for storing data that is manipulated by the processor 1216 when executing software. The processing circuit 1202 further includes at least one of the modules 1204, 1206 and 1208. The modules 1204, 1206 and 1208 may be software modules running in the processor 1216, resident/stored in the processor-readable storage medium 1218, one or more hardware modules coupled to the processor 1216, or some combination thereof. The modules 1204, 1206 and 1208 may include microcontroller instructions, state machine configuration parameters, or some combination thereof.

In one configuration, the apparatus 1200 includes modules and/or circuits 1204 adapted to manage the physical layer circuit 1214, including the configurable line drivers. In one example, the processor 1216 may cause one or more modules and/or circuits 1204 to modify a configuration value in a register that determines mode of operation for the configurable line drivers. The apparatus 1200 may include modules and/or circuits 1206 configured to provide pulses that are transmitted over the multi-wire communication link 1212. In one example, the modules and/or circuits 1206 may use timing information to cause a configurable line driver to alternately drive and release SDA to provide a pulse in open-drain mode. The apparatus 1200 may include modules and/or circuits 1206 configured to participate in an in-band interrupt request process. In one example, the modules and/or circuits 1206 may perform a process in accordance with the method described in FIG. 11.

In certain examples, the apparatus 1200 has a line driver adapted to couple the apparatus 1200 to SDA of an I3C serial bus, where the line driver can be configured to operate in an open-drain mode of operation. The apparatus 1200 may include a processor 1216 configured to cause the line driver to drive SDA from a high state to a low state before a first clock pulse is received from SCL of the I3C serial bus after a start condition has been provided on the I3C serial bus. Driving SDA from the high state to the low state may produce an initial pulse on the data line. The processor 1216 may be further configured to transmit one or more additional pulses on SDA before the first clock pulse is transmitted on SCL. The processor 1216 may be further configured to drive SDA low until a rising edge of the first clock pulse is detected on SCL after each of the plurality of additional pulses has been successfully transmitted on SDA. A pulse transmitted on the SDA by one or more other slave devices may be suppressed when SDA is driven low.

The processor 1216 may be further configured to configure the line driver for the open-drain mode of operation before driving the data line from the high state to the low state. The processor 1216 may be further configured to terminate transmission on the data line until another start condition is provided on the I3C serial bus after detecting that one of the plurality of additional pulses has been suppressed. The processor 1216 may be further configured to participate in an interrupt service activity after each of the plurality of additional pulses has been successfully transmitted on the data line. The plurality of additional pulses includes a number of pulses provided in accordance with configuration information maintained by the slave device.

The processor 1216 may be further configured to initiate an urgent in-band interrupt request after participating unsuccessfully a number of interrupt service arbitration procedures that exceeds a threshold maximum number of interrupt service arbitration procedures defined for the slave device. In one example, the urgent in-band interrupt request is initiated by driving the data line from the high state to the low state before the first clock pulse is transmitted on the clock line. The processor 1216 may be further configured to participate in an urgent interrupt identification and arbitration process after initiating the urgent in-band interrupt request. The urgent interrupt identification and arbitration process may be decided based on number of plurality of additional pulses associated with each device participating in the urgent interrupt identification and arbitration process.

The processor-readable storage medium 1218 may be a non-transitory storage medium and may store code that, when executed by one or more processors, causes the one or more processors to perform one or more of the processes and/or methods disclosed herein. For example, the processor-readable storage medium 1218 may include instructions for driving a data line of an I3C serial bus from a high state to a low state before a first clock pulse is received from a clock line of the I3C serial bus after a start condition has been provided on the I3C serial bus. Driving the data line from the high state to the low state may produce an initial pulse on the data line. The processor-readable storage medium 1218 may include instructions for transmitting one or more additional pulses on the data line before the first clock pulse is transmitted on the clock line, and driving the data line low until a rising edge of the first clock pulse is detected on the clock line after each of the plurality of additional pulses has been successfully transmitted on the data line.

The processor-readable storage medium 1218 may include instructions for causing a line driver coupling the slave device to the data line to enter an open-drain mode of operation before driving the data line from the high state to the low state. The processor-readable storage medium 1218 may include instructions for terminating transmission on the data line until another start condition is provided on the I3C serial bus after detecting that one of the plurality of additional pulses has been suppressed. The processor-readable storage medium 1218 may include instructions for participating in an interrupt service activity after each of the plurality of additional pulses has been successfully transmitted on the data line.

The processor-readable storage medium 1218 may include instructions for initiating an urgent in-band interrupt request after participating unsuccessfully a number of interrupt service arbitration procedures that exceeds a threshold maximum number of interrupt service arbitration procedures defined for the slave device. The urgent in-band interrupt request may be initiated by driving the data line from the high state to the low state before the first clock pulse is received from the clock line. The processor-readable storage medium 1218 may include instructions for participating in an urgent interrupt identification and arbitration process after initiating the urgent in-band interrupt request. The urgent interrupt identification and arbitration process may be decided based on number of plurality of additional pulses associated with each device participating in the urgent interrupt identification and arbitration process.

Figure 13:
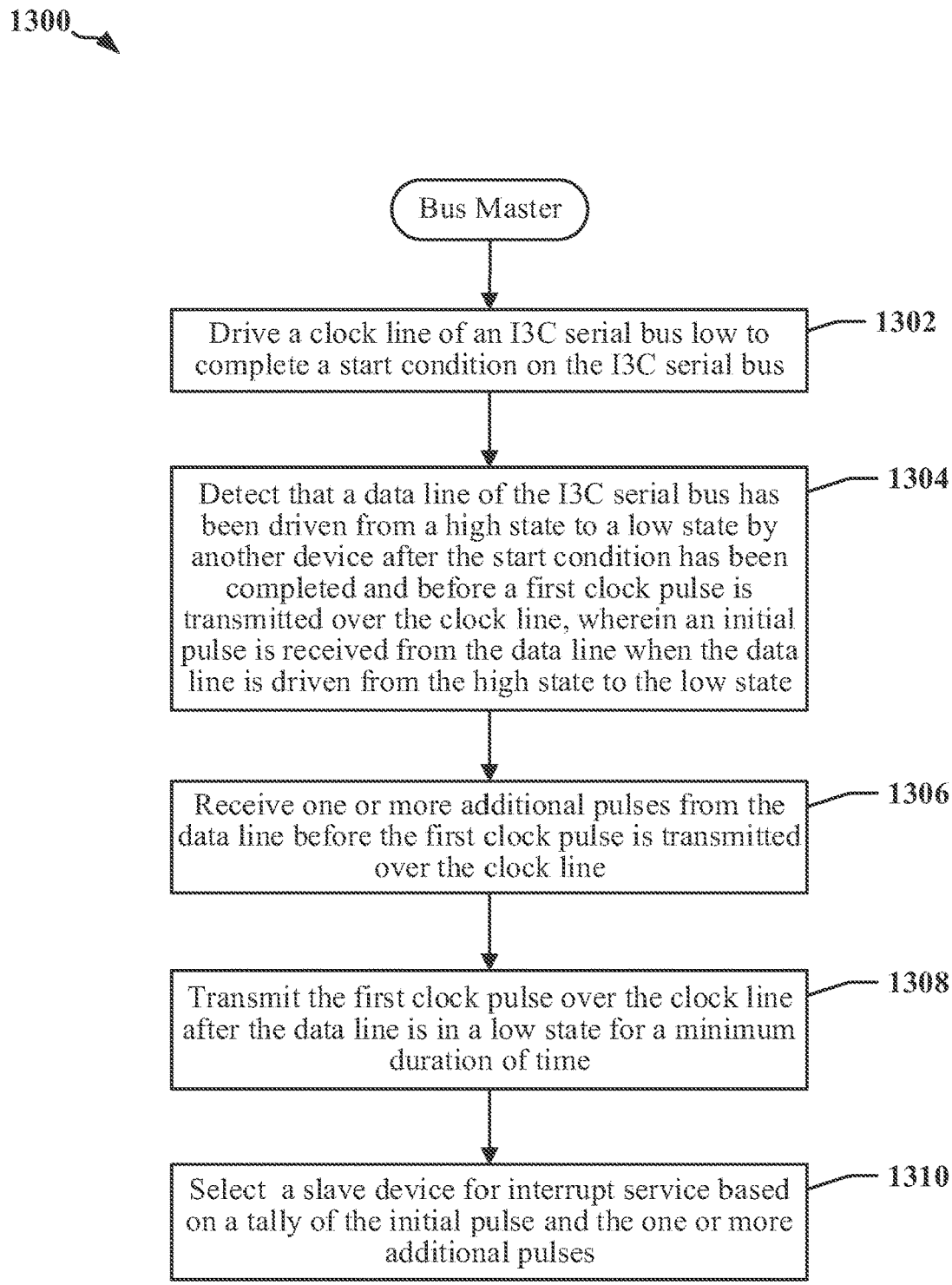
FIG. 13 is a flowchart illustrating a data communication method performed at a bus master coupled to a serial bus in accordance with certain aspects disclosed herein.

FIG. 13 is a flowchart 1300 illustrating a data communication method performed at a bus master coupled to a serial bus. The method relates to an in-band interrupt technique that enhances the priority of the slave device in order to increase the likelihood that the slave device can access the serial bus and/or acquire the attention of another device coupled to the serial bus.

At block 1302, the bus master may drive a clock line (SCL) of an I3C serial bus low to complete a start condition on the I3C serial bus. In one example, the start condition may be initiated by the bus master. In another example, the start condition may be initiated by a device other than the bus master. In some instances, a slave device may initiate the start condition by driving SDA low while the bus is idle, as indicated when both SCL and SDA are high for some duration of time. After the start condition, SDA may return to the high state. Driving SDA from the high state to the low state produces an initial pulse on the data line. The bus master may cause a line driver coupling the bus master to the data line to enter an open-drain mode of operation before driving the clock line of the I3C serial bus low to complete the start condition. The bus master may have initiated the start condition on the I3C serial bus.

At block 1304, the bus master may detect that SDA of the I3C serial bus has been driven from a high state to a low state by another device after the start condition has been completed and before a first clock pulse is transmitted over the clock line. The initial pulse may be received from SDA when SDA is driven from the high state to the low state. After the bus master has driven SCL to complete the start condition, all devices coupled to the serial bus may release SDA, causing SDA to be pulled high by a pullup resistor connected to SDA when the bus is in open-drain mode.

At block 1306, the bus master may receive one or more additional pulses from the data line before the first clock pulse is transmitted over the clock line.

At block 1308, the bus master may transmit the first clock pulse over the clock line after the data line is in a low state for a minimum duration of time. The duration of time may be calculated to ensure that no more additional pulses will be transmitted. The duration of time may be preconfigured and/or may be fixed or variable.

At block 1310, the bus master may select a slave device for interrupt service based on a tally of the initial pulse and the one or more additional pulses.

In some examples, the bus master may determine a unique address of the slave device selected for interrupt service by using the tally to index a table of configuration information.

The bus master may initiate an interrupt service activity involving the slave device selected for interrupt service after transmitting the first clock pulse over the clock line. The bus master may select the interrupt service activity by using the tally to index a table of configuration information. The bus master may write configuration information to one or more slave devices, the configuration information including a number of pulses to be transmitted by the one or more slave devices during an urgent interrupt identification and arbitration process. For each slave device, the pulses to be transmitted during the urgent interrupt identification and arbitration process may include the initial pulse and a number of additional pulses.

Figure 14:
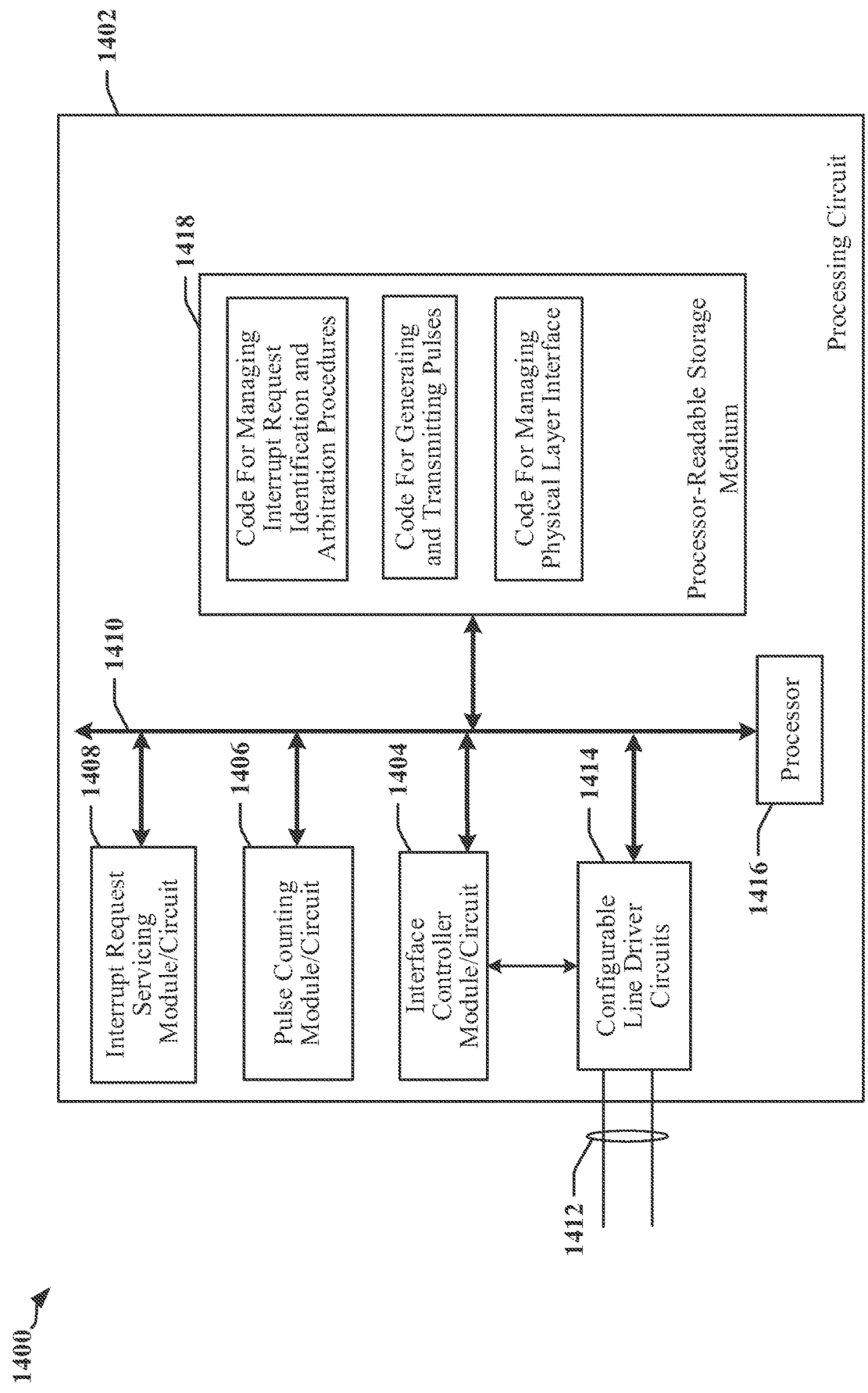
FIG. 14 illustrates a hardware implementation for an apparatus adapted that includes a bus master operated in accordance with certain aspects disclosed herein.

FIG. 14 is a diagram illustrating a simplified example of a hardware implementation for an apparatus 1400 employing a processing circuit 1402. The processing circuit typically has a controller or processor 1416 and/or may include one or more microprocessors, microcontrollers, digital signal processors, sequencers and/or state machines. The processing circuit 1402 may be implemented with a bus architecture, represented generally by the bus 1410. The bus 1410 may include any number of interconnecting buses and bridges depending on the specific application of the processing circuit 1402 and the overall design constraints. The bus 1410 links together various circuits including one or more processors and/or hardware modules, represented by the controller or processor 1416, the modules or circuits 1404, 1406 and 1408, and the processor-readable storage medium 1418. The apparatus may be coupled to a multi-wire communication link using a physical layer circuit 1414 that includes configurable line drivers. The configurable line drivers may operate in multiple modes, including push-pull and open-drain modes, unidirectional and bidirectional modes and high-impedance (disabled) modes. The physical layer circuit 1414 may be coupled to the multi-wire communication link 1412 to support communications in accordance with an I3C protocol, for example. The bus 1410 may also link various other circuits such as timing sources, peripherals, voltage regulators, and power management circuits, which are well known in the art, and therefore, will not be described any further.

The processor 1416 is responsible for general processing, including the execution of software, code and/or instructions stored on the processor-readable storage medium 1418. The computer-readable storage medium may include a non-transitory storage medium. The software, when executed by the processor 1416, causes the processing circuit 1402 to perform the various functions described supra for any particular apparatus. The computer-readable storage medium may be used for storing data that is manipulated by the processor 1416 when executing software. The processing circuit 1402 further includes at least one of the modules 1404, 1406 and 1408. The modules 1404, 1406 and 1408 may be software modules running in the processor 1416, resident/stored in the processor-readable storage medium 1418, one or more hardware modules coupled to the processor 1416, or some combination thereof. The modules 1404, 1406 and 1408 may include microcontroller instructions, state machine configuration parameters, or some combination thereof.

In one configuration, the apparatus 1400 includes modules and/or circuits 1404 adapted to manage the physical layer circuit 1414, including the configurable line drivers. In one example, the processor 1416 may cause one or more modules and/or circuits 1404 to modify a configuration value in a register that determines mode of operation for the configurable line drivers. The apparatus 1400 may include modules and/or circuits 1406 configured to count pulses that are received from, or detected on the multi-wire communication link 1412. The apparatus 1400 may include modules and/or circuits 1406 configured to manage in an in-band interrupt request process. In one example, the modules and/or circuits 1406 may perform a process in accordance with the method described in FIG. 13.

In certain examples, the apparatus 1400 has a first line driver adapted to couple the apparatus to SDA of an I3C serial bus, and a second line driver adapted to couple the apparatus to SDA of the I3C serial bus. The second line driver may be configurable for multiple modes of operation, including an open-drain mode of operation. The apparatus further includes a processor 1416 configured to cause the first line driver to drive a clock line of an I3C serial bus low to complete a start condition on the I3C serial bus, and detect that a data line of the I3C serial bus has been driven from a high state to a low state by another device after the start condition has been completed and before a first clock pulse is transmitted over the clock line. The apparatus may have initiated the start condition on the I3C serial bus. An initial pulse is received from the data line when the data line is driven from the high state to the low state. The processor 1416 is further configured to receive one or more additional pulses from the data line before the first clock pulse is transmitted over the clock line, cause the first line driver to transmit the first clock pulse over the clock line after the data line is in a low state for a minimum duration of time, and select a slave device for interrupt service based on a tally of the initial pulse and the one or more additional pulses.

The processor 1416 may be further configured to configure the second line driver for the open-drain mode of operation before causing the first line driver to drive the clock line of the I3C serial bus low to complete the start condition. The processor 1416 may be further configured to determine a unique address of the slave device selected for interrupt service by using the tally to index a table of configuration information. The processor 1416 may be further configured to initiate an interrupt service activity involving the slave device selected for interrupt service after transmitting the first clock pulse over the clock line. The processor 1416 may be further configured to select the interrupt service activity by using the tally to index a table of configuration information.

The processor 1416 may be further configured to write configuration information to one or more slave devices, the configuration information including a number of pulses to be transmitted by the one or more slave devices during an urgent interrupt identification and arbitration process. For each slave device, the pulses to be transmitted during the urgent interrupt identification and arbitration process include the initial pulse and a number of additional pulses.

The processor-readable storage medium 1418 may be a non-transitory storage medium and may store code that, when executed by one or more processors, causes the one or more processors to perform one or more of the processes and/or methods disclosed herein. For example, the processor-readable storage medium 1418 may include instructions for driving a clock line of an I3C serial bus low to complete a start condition on the I3C serial bus, detecting that a data line of the I3C serial bus has been driven from a high state to a low state by another device after the start condition has been completed and before a first clock pulse is transmitted over the clock line. An initial pulse may be received from the data line when the data line is driven from the high state to the low state. The processor-readable storage medium 1418 may include instructions for receiving one or more additional pulses from the data line before the first clock pulse is transmitted over the clock line, transmitting the first clock pulse over the clock line after the data line is in a low state for a minimum duration of time, and selecting a slave device for interrupt service based on a tally of the initial pulse and the one or more additional pulses.

The processor-readable storage medium 1418 may include instructions for causing a line driver coupling the bus master to the data line to enter an open-drain mode of operation before driving the clock line of the I3C serial bus low to complete the start condition. The processor-readable storage medium 1418 may include instructions for initiating the start condition on the I3C serial bus. The processor-readable storage medium 1418 may include instructions for determining a unique address of the slave device selected for interrupt service by using the tally to index a table of configuration information.

The processor-readable storage medium 1418 may include instructions for initiating an interrupt service activity involving the slave device selected for interrupt service after transmitting the first clock pulse over the clock line. The processor-readable storage medium 1418 may include instructions for selecting the interrupt service activity by using the tally to index a table of configuration information.

The processor-readable storage medium 1418 may include instructions for writing configuration information to one or more slave devices, the configuration information including a number of pulses to be transmitted by the one or more slave devices during an urgent interrupt identification and arbitration process. For each slave device, the pulses to be transmitted during the urgent interrupt identification and arbitration process include the initial pulse and a number of additional pulses.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A data communication method performed at a slave device, comprising:

driving a data line of an I3C serial bus from a high state to a low state before a first clock pulse is received from a clock line of the I3C serial bus after a start condition has been provided on the I3C serial bus, wherein driving the data line from the high state to the low state produces an initial pulse on the data line;

transmitting one or more additional pulses on the data line before the first clock pulse is transmitted on the clock line; and driving the data line low until a rising edge of the first clock pulse is detected on the clock line after each of the one or more additional pulses has been successfully transmitted on the data line.

2. The data communication method of claim 1, further comprising:

causing a line driver coupling the slave device to the data line to enter an open-drain mode of operation before driving the data line from the high state to the low state.

3. The data communication method of claim 1, wherein driving the data line low suppresses a pulse transmitted on the data line by one or more other slave devices.

4. The data communication method of claim 1, further comprising:

terminating transmission on the data line until another start condition is provided on the I3C serial bus after detecting that one of the one or more additional pulses has been suppressed.

5. The data communication method of claim 1, further comprising:

participating in an interrupt service activity after each of the one or more additional pulses has been successfully transmitted on the data line.

6. The data communication method of claim 1, wherein the one or more additional pulses includes a number of pulses provided in accordance with configuration information maintained by the slave device.

7. The data communication method of claim 1, further comprising:

initiating an urgent in-band interrupt request after participating unsuccessfully a number of interrupt service arbitration procedures that exceeds a threshold maximum number of interrupt service arbitration procedures defined for the slave device, wherein the urgent in-band interrupt request is initiated by driving the data line from the high state to the low state before the first clock pulse is received from the clock line.

8. The data communication method of claim 7, further comprising:

participating in an urgent interrupt identification and arbitration process after initiating the urgent in-band interrupt request, wherein the urgent interrupt identification and arbitration process is decided based on number of plurality of additional pulses associated with each device participating in the urgent interrupt identification and arbitration process.

9. An apparatus for data communication, comprising:

a line driver adapted to couple the apparatus to a data line of an I3C serial bus and configurable for an open-drain mode of operation; and a processor configured to:

cause the line driver to drive the data line from a high state to a low state before a first clock pulse is received from a clock line of the I3C serial bus after a start condition has been provided on the I3C serial bus, wherein driving the data line from the high state to the low state produces an initial pulse on the data line;

transmit one or more additional pulses on the data line before the first clock pulse is transmitted on the clock line; and drive the data line low until a rising edge of the first clock pulse is detected on the clock line after each of the one or more additional pulses has been successfully transmitted on the data line.

10. The apparatus of claim 9, wherein the processor is further configured to:

configure the line driver for the open-drain mode of operation before driving the data line from the high state to the low state.

11. The apparatus of claim 9, wherein a pulse transmitted on the data line by one or more other slave devices is suppressed when the data line is driven low.

12. The apparatus of claim 9, wherein the processor is further configured to:

terminate transmission on the data line until another start condition is provided on the I3C serial bus after detecting that one of the one or more additional pulses has been suppressed.

13. The apparatus of claim 9, wherein the processor is further configured to:

participate in an interrupt service activity after each of the one or more additional pulses has been successfully transmitted on the data line.

14. The apparatus of claim 9, wherein the one or more additional pulses includes a number of pulses provided in accordance with configuration information maintained by the apparatus.

15. The apparatus of claim 9, wherein the processor is further configured to:

initiate an urgent in-band interrupt request after participating unsuccessfully a number of interrupt service arbitration procedures that exceeds a threshold maximum number of interrupt service arbitration procedures defined for the apparatus, wherein the urgent in-band interrupt request is initiated by driving the data line from the high state to the low state before the first clock pulse is transmitted on the clock line.

16. The apparatus of claim 15, wherein the processor is further configured to:

participate in an urgent interrupt identification and arbitration process after initiating the urgent in-band interrupt request, wherein the urgent interrupt identification and arbitration process is decided based on number of plurality of additional pulses associated with each device participating in the urgent interrupt identification and arbitration process.

17. A data communication method performed at a bus master, comprising:

driving a clock line of an I3C serial bus low to complete a start condition on the I3C serial bus;

detecting that a data line of the I3C serial bus has been driven from a high state to a low state by another device after the start condition has been completed and before a first clock pulse is transmitted over the clock line, wherein an initial pulse is received from the data line when the data line is driven from the high state to the low state;

receiving one or more additional pulses from the data line before the first clock pulse is transmitted over the clock line;

transmitting the first clock pulse over the clock line after the data line is in the low state for a minimum duration of time; and selecting a slave device for interrupt service based on a tally of the initial pulse and the one or more additional pulses.

18. The data communication method of claim 17, further comprising:

causing a line driver coupling the bus master to the data line to enter an open-drain mode of operation before driving the clock line of the I3C serial bus low to complete the start condition.

19. The data communication method of claim 17, further comprising:

initiating the start condition on the I3C serial bus.

20. The data communication method of claim 17, further comprising:

determining a unique address of the slave device selected for interrupt service by using the tally to index a table of configuration information.

21. The data communication method of claim 17, further comprising:

initiating an interrupt service activity involving the slave device selected for interrupt service after transmitting the first clock pulse over the clock line.

22. The data communication method of claim 21, further comprising:

selecting the interrupt service activity by using the tally to index a table of configuration information.

23. The data communication method of claim 17, further comprising:

writing configuration information to one or more slave devices, the configuration information including a number of pulses to be transmitted by the one or more slave devices during an urgent interrupt identification and arbitration process, wherein, for each slave device, the number of pulses to be transmitted during the urgent interrupt identification and arbitration process includes the initial pulse and a number of additional pulses.

24. An apparatus for data communication, comprising:

a first line driver adapted to couple the apparatus to a clock line of an I3C serial bus; and a second line driver adapted to couple the apparatus to a data line of the I3C serial bus, the second line driver being configurable for an open-drain mode of operation; and a processor configured to:

cause the first line driver to drive the clock line of the I3C serial bus low to complete a start condition on the I3C serial bus;

detect that the data line of the I3C serial bus has been driven from a high state to a low state by another device after the start condition has been completed and before a first clock pulse is transmitted over the clock line, wherein an initial pulse is received from the data line when the data line is driven from the high state to the low state;

receive one or more additional pulses from the data line before the first clock pulse is transmitted over the clock line;

cause the first line driver to transmit the first clock pulse over the clock line after the data line is in the low state for a minimum duration of time; and select a slave device for interrupt service based on a tally of the initial pulse and the one or more additional pulses.

25. The apparatus of claim 24, wherein the processor is further configured to:

configure the second line driver for the open-drain mode of operation before causing the first line driver to drive the clock line of the I3C serial bus low to complete the start condition.

26. The apparatus of claim 24, wherein the processor is further configured to:

initiate the start condition on the I3C serial bus.

27. The apparatus of claim 24, wherein the processor is further configured to:

determine a unique address of the slave device selected for interrupt service by using the tally to index a table of configuration information.

28. The apparatus of claim 24, wherein the processor is further configured to:

initiate an interrupt service activity involving the slave device selected for interrupt service after transmitting the first clock pulse over the clock line.

29. The apparatus of claim 28, wherein the processor is further configured to:

select the interrupt service activity by using the tally to index a table of configuration information.

30. The apparatus of claim 24, wherein the processor is further configured to:

write configuration information to one or more slave devices, the configuration information including a number of pulses to be transmitted by the one or more slave devices during an urgent interrupt identification and arbitration process, wherein, for each slave device, the number of pulses to be transmitted during the urgent interrupt identification and arbitration process includes the initial pulse and a number of additional pulses.

* * * * *

UNITED STATES PATENT AND TRADEMARK OFFICE
CERTIFICATE OF CORRECTION

PATENT NO. : 10,678,723 B2
APPLICATION NO. : 16/134559
DATED : June 9, 2020
INVENTOR(S) : Sharon Graif, Lior Amarilio and Mark Gakman It is certified that error appears in the above-identified patent and that said Letters Patent is hereby corrected as shown below:

On the Title Page

Item (72) Please correct spelling of city of inventor one to Zichron Yaakov

Signed and Sealed this
Twenty-second Day of September, 2020

Andrei Iancu
*Director of the United States Patent and Trademark Office*